(12) United States Patent
Hirouchi et al.

(10) Patent No.: US 7,850,309 B2
(45) Date of Patent: Dec. 14, 2010

(54) PROJECTION TYPE IMAGE DISPLAY APPARATUS

(75) Inventors: Yasuyuki Hirouchi, Osaka (JP); Taichi Yoshimura, Osaka (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 617 days.

(21) Appl. No.: 11/892,974

(22) Filed: Aug. 29, 2007

(65) Prior Publication Data

US 2008/0055553 A1 Mar. 6, 2008

(30) Foreign Application Priority Data

Aug. 31, 2006 (JP) .............................. 2006-236250

(51) Int. Cl.
*G03B 21/20* (2006.01)
(52) U.S. Cl. .......................................... 353/52; 353/57
(58) Field of Classification Search .................... 353/52, 353/57–61
See application file for complete search history.

(56) References Cited

U.S. PATENT DOCUMENTS

| | | | |
|---|---|---|---|
| 7,052,144 B2 * | 5/2006 | Nakamura | 353/61 |
| 7,147,349 B2 * | 12/2006 | Kato et al. | 362/294 |
| 7,150,543 B2 * | 12/2006 | Fujimori et al. | 353/54 |
| 7,607,781 B2 * | 10/2009 | Yun et al. | 353/55 |
| 2005/0002196 A1 | 1/2005 | Nakamura et al. | |

FOREIGN PATENT DOCUMENTS

| | | |
|---|---|---|
| JP | 63-271803 A | 11/1988 |
| JP | 2002-350978 | 12/2002 |
| JP | 2003-287814 A | 10/2003 |
| JP | 2005-026072 | 1/2005 |

OTHER PUBLICATIONS

Chinese Office Action dated Nov. 20, 2009, issued in corresponding Chinese Patent Application No. 200710142262.1.
Japanese Office Action dated Sep. 9, 2008 (mailing date), issued in corresponding Japanese Patent Application No. 2006-236250.

* cited by examiner

*Primary Examiner*—Seung C Sohn
(74) *Attorney, Agent, or Firm*—Westerman, Hattori, Daniels & Adrian, LLP

(57) ABSTRACT

Elements of an optical system (12) of a projection type image display apparatus are stored in an optical system storage (46) having an upper opening in such a way that the optical element to be arranged close to a light source is fitted in the frame provided in the high-temperature region of the optical system storage (46) close to the light source, while the rest of the optical elements are respectively fitted in the frames in the low-temperature region of the optical system storage (46) remote from the light source. The upper opening in the high-temperature region is covered, in the low-temperature region, with a resilient metal lid (471), and, in the low-temperature region, covered with a resilient resin lid (472). Portions of these lids are partially cut into spring-like narrow strips having tips configured to firmly and accurately hold the lenses fitted in the respective frames, whereby the dimensional tolerances of the optical elements and the frames can be absorbed solely by the lids without resorting to any other parts.

3 Claims, 23 Drawing Sheets

PROJECTION TYPE IMAGE DISPLAY APPARATUS

FIELD OF THE INVENTION

This invention relates to a projected type image display apparatus, particularly to a casing for accommodating an optical system for use with such image display apparatus.

BACKGROUND OF THE INVENTION

In order to maintain required precision, the optical system (optical apparatus) of a projection type image display apparatus such as a liquid crystal projector is generally encased in a heat-resistive resin casing that does not exhibit appreciable heat-shrinkage, since the light source of the image display apparatus becomes very hot.

In spite the elements of the optical system must be firmly fixed at precise positions, they have dimensional tolerances. However, heat-resistive non-shrinkable resins generally have little elasticity, so that they can scarcely absorb the dimensional tolerances of the optical elements. As a consequence, each of the optical elements is mostly fixed using an additional resilient element, as disclosed in Japanese Patent Application Laid Open No. 2003-287814.

This approach, however, requires a large number of such additional resilient elements, which disadvantageously adds extra manufacturing steps and cost to the apparatus, in addition to the cost of the heat-resistive resin.

SUMMARY OF THE INVENTION

In view of such problems pertinent to conventional optical systems, the present invention is directed to a projection type image display apparatus equipped with an optical system in such a way that the dimensional tolerances of the optical elements can be absorbed by lids of a storage that accommodates the optical elements, thereby allowing the optical system to be firmly fixed with required precision without using any additional parts. (The storage will be hereinafter referred to as optical system storage.)

In order to attain the object stated above, there is provided in accordance with one aspect of the invention a projection type image display apparatus equipped with an optical system adapted to project modulated imaging light obtained by modulating beams of light emitted from a high-temperature light source based on the image signals received to form an enlarged image on a display screen, the display apparatus comprising an optical system storage for storing the optical system, the optical system storage having:

an upper opening;

a high-temperature region for accommodating an optical element to be arranged proximal to the light source;

a low-temperature region for accommodating optical elements to be arranged distant from the light source; and a multiplicity of frames arranged in the upper opening, each of the frames having an upper opening for receiving an optical element, the opening in the high-temperature region covered with a resilient metal lid and, in said low-temperature region, covered with a resilient resin lid.

Since this arrangement requires no such additional parts as required in conventional ones for fixing the optical elements precisely in position, the apparatus can be manufactured in a fewer steps using a small number of parts and at a greatly reduced cost without using a costly heat-resistive resin for the lid.

In this arrangement, the optical system may comprise:

at least a first integrator lens, an iris diaphragm, a second integrator lens, a slit, a polarization beam splitter, and a condenser lens, arranged to allow a beam of white light emitted from said light source to pass through them in a desired manner;

a multiplicity of dichroic mirrors for splitting the white light that has passed through the condenser lens into red (R), green (G), and blue (B) light;

three liquid crystal panels for respectively extracting R, G, B light;

a color composition prism for composing the R, G, B lights into tri-color imaging light; and a projection lens for projecting the tri-color imaging light.

The optical system may be configured to absorb the dimensional tolerances of the optical elements and the frames by having:

the first integrator lens (to be arranged close to the light source) fitted in the frame in the high-temperature region;

a portion of the metal lid, associated with this frame, cut into spring-like narrow strips having V-shaped projecting tips for firmly holding the upper end of said first integrator lens fitted in said frame;

lenses of the optical system other than the first integrator lens fitted in the respective frames in the low-temperature region; and portions of the resin lid, associated with the respective frames, partially cut into spring-like narrow strips having protruding tips for firmly holding the upper ends of the lenses fitted in the respective frames.

DETAILED DESCRIPTION OF THE PREFERRED EMBODIMENT

Figure 1:
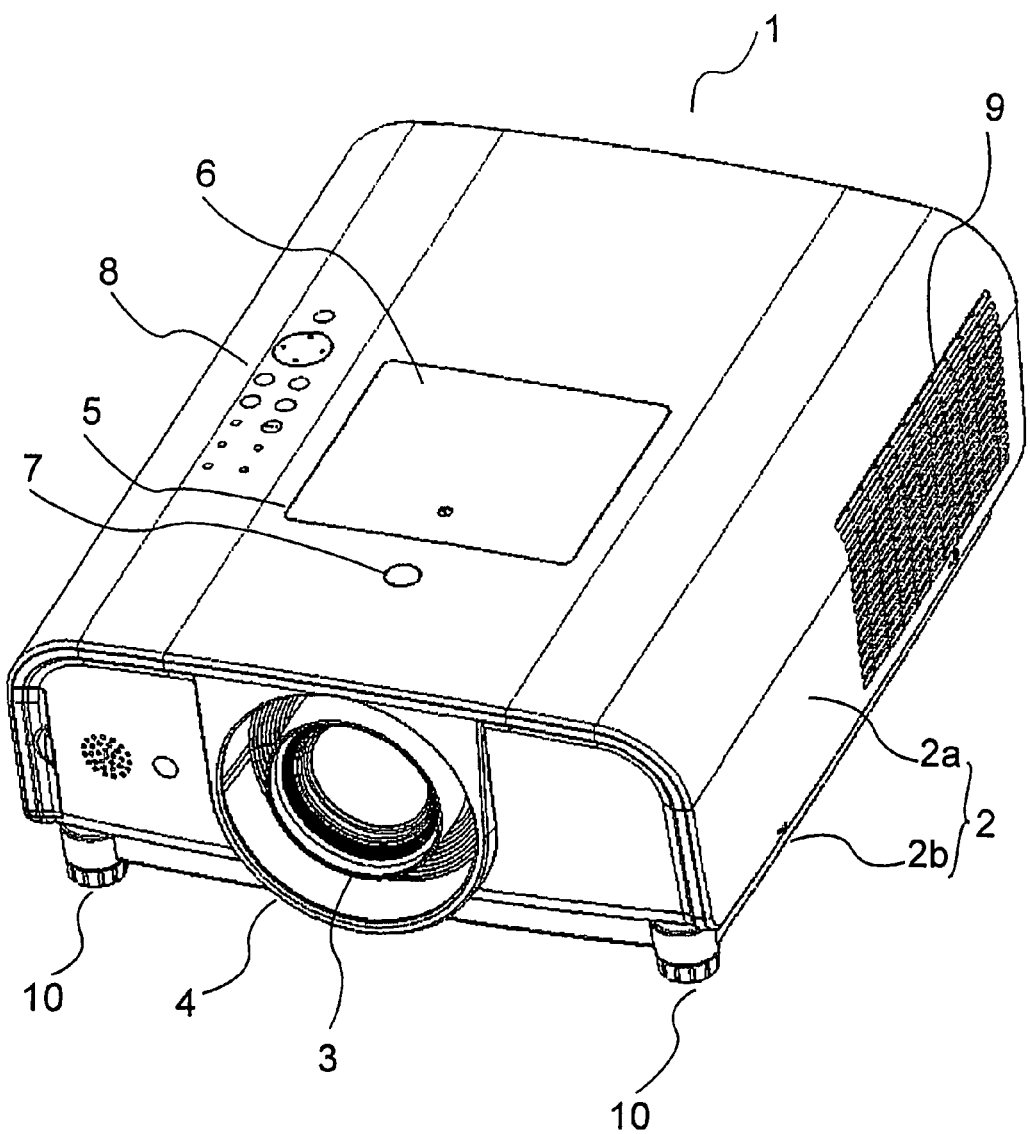
FIG. 1 is a perspective view of a projection type image display apparatus in the form of a liquid crystal projector in accordance with one embodiment of the present invention.
Figure 2:
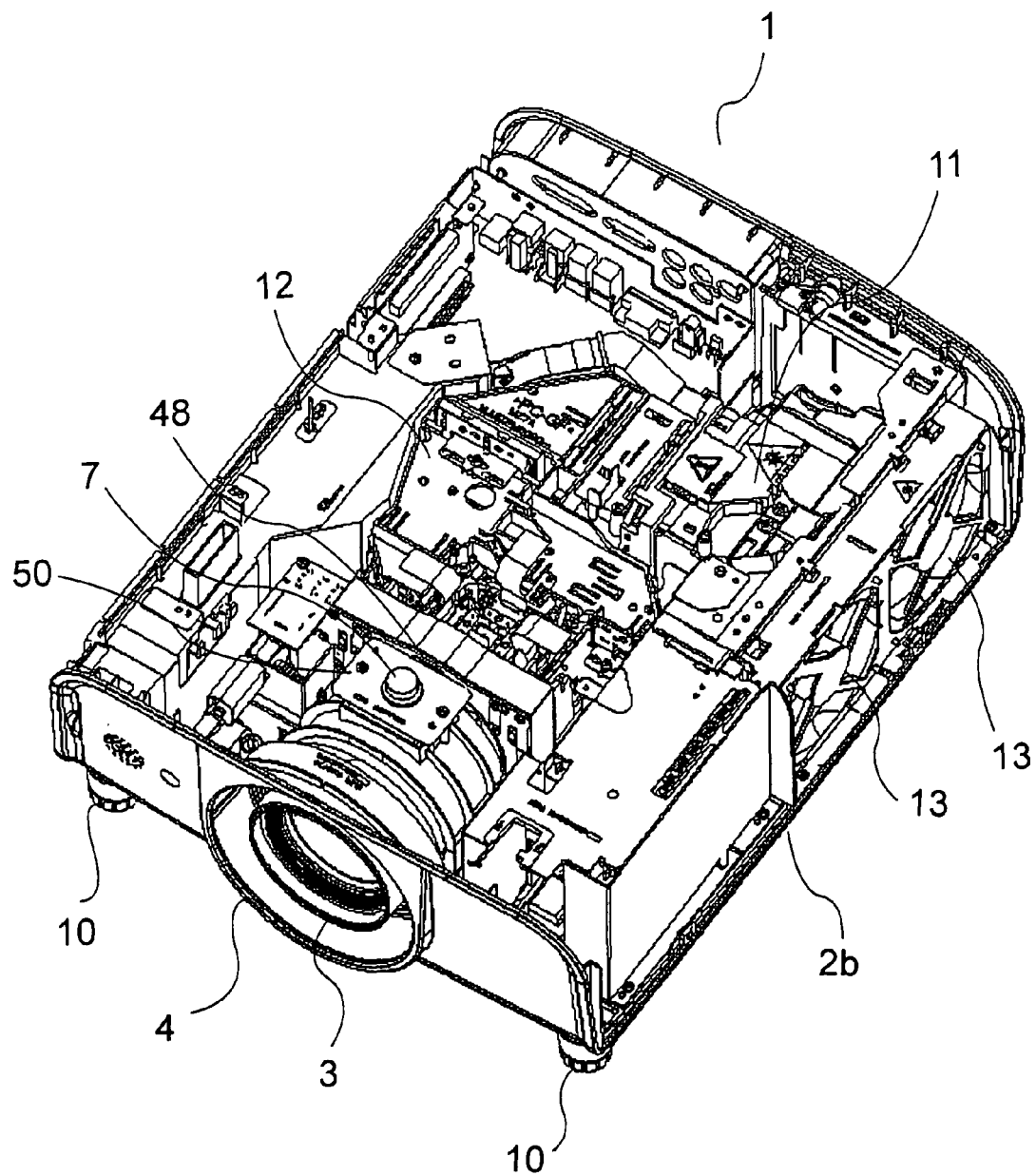
FIG. 2 is a perspective view of the liquid crystal projector with the upper casing removed to show its internal arrangement.

The invention will now be described in detail by way of example with reference to the accompanying drawings. Referring to FIG. 1, there is shown in oblique perspective view a projection type image display apparatus in the form of a liquid crystal projector in accordance with one embodiment of the invention. FIG. 2 is an oblique perspective view of the projector with its upper case removed.

As seen in FIG. 1, this liquid crystal projector 1 has a casing 2, which consists of an upper casing 2a and a lower casing 2b. The internal structure of the projector will appear when the upper casing 2a is removed, as shown in FIG. 2.

There is provided at the center of the front end of the casing 2 a projection window 4 where a projection lens 3 is exposed. Formed in the central area of the upper end of the casing 2 are a maintenance opening 5 and a lid 6 for closing the opening 5 as needed. There are also provided in front of the maintenance opening 5 a projection lens removal button 7 for removing the projection lens 3, and a manipulation indicator 8 to the left of the opening 5. A ventilation hole 9 for ventilating cooling air is formed in the rear section of the right end of the casing 2. In addition, the casing 2 is provided on the opposite sides of the bottom end thereof with adjustable legs 10 for adjusting the height of the front end of the casing 2.

Mounted inside the casing 2 is an optical system 12 consisting of optical elements arranged between a light source unit 11 located at a right rear position of the casing 2 and the projection lens 3, as shown in FIG. 2. Cooling fans 13 for cooling the light source unit 11 and other relevant elements are provided adjacent the ventilation hole 9 shown in FIG. 1.

Figure 3:
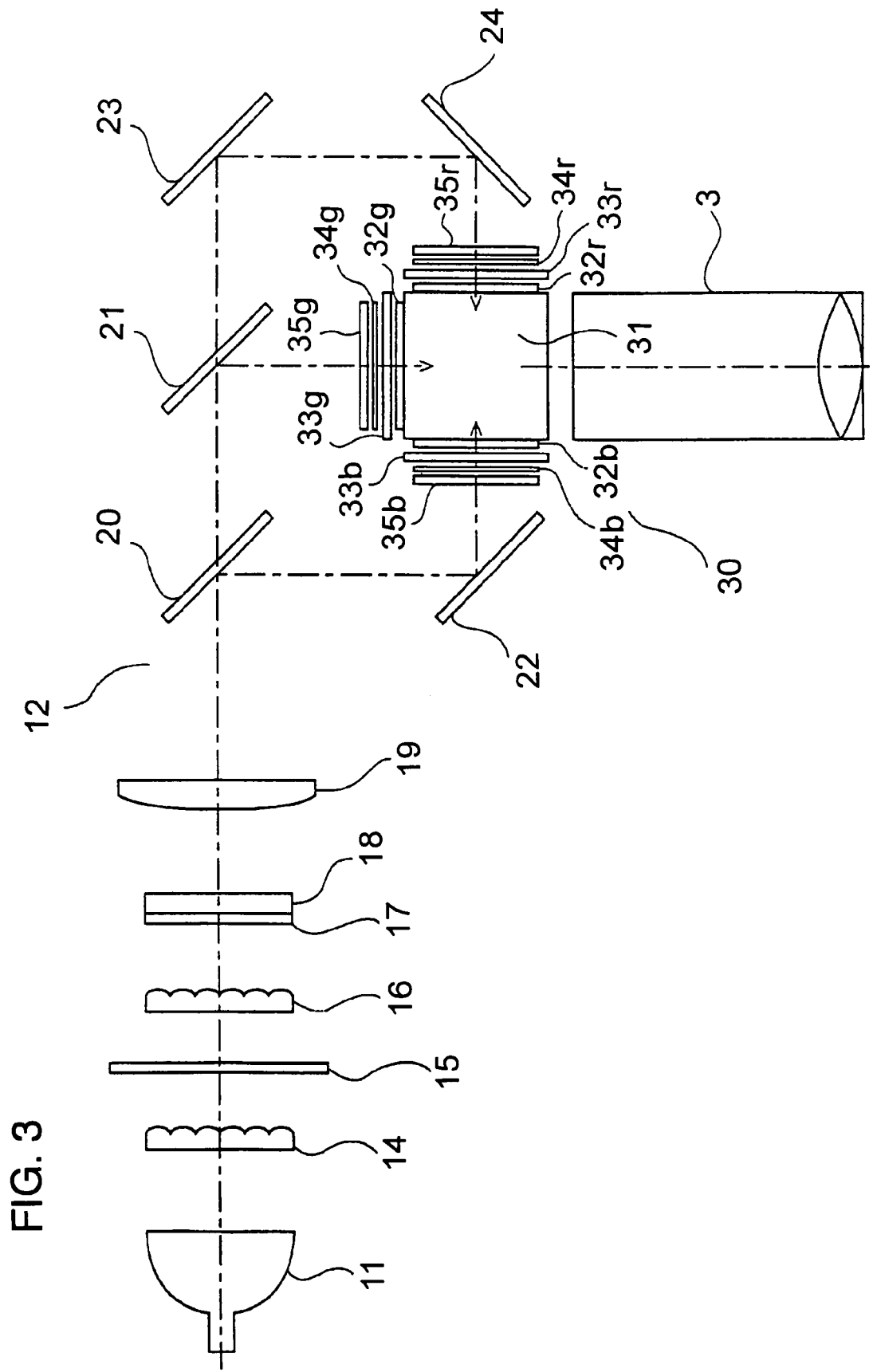
FIG. 3 shows an exemplary arrangement of the optical system of the projector.

FIG. 3 illustrates an exemplary arrangement of the optical system 12. It will be clear that the optical system 12 is not limited to the one shown in FIG. 3 and that the present invention can be applied to different types of optical systems. As shown in FIG. 3, a beam of white light emitted from the light source unit 11 is led to a first dichroic mirror 20 via a first integrator lens 14, an aperture diaphragm mechanism 15, a second integrator lens 16, a slit-plate 17, a polarizing beam splitter 18, and a condenser lens (collective lens) 19.

Each of the first and second integrator lens 14 and 16, respectively, is a fly-eye lens consisting of a multiplicity of heat-resistive glass cells arrayed in a matrix form so that they evenly re-distribute the white light from the light source unit 11 to render its illumination distribution uniform. The polarizing beam splitter 18 is adapted to extract either P-wave or S-wave component of the incident light. The slit-plate 17, made of a thin aluminum plate (e.g. film) cuts off those components of the incident light which are irrelevant to the polarizing beam splitter 18.

The light that has passed the polarizing beam splitter 18 is passed through the condenser lens 19 to the first dichroic mirror 20. The first dichroic mirror 20 reflects only the blue component of the incident light, permitting red and green lights to pass through it, while the second dichroic mirror 21 reflects the green light. As a consequence, white light emitted from the light source unit 11 is split into blue, green, and red lights by the first and second dichroic mirrors 20 and 21, respectively. The blue light reflected from the first dichroic mirror 20 is reflected again by a field mirror 22, and directed to an image generation device 30. The green light reflected from the second dichroic mirror 21 is directly passed to the image generation device 30. The red light that has passed through the second dichroic mirror 21 is further reflected by the field mirrors 23 and 24 and then directed to the image generation device 30.

The image generation device 30 includes a cubic color compounding prism 31 having three sides respectively bearing thereon liquid crystal panels 33r, 33g, and 33b for red, green, and blue lights via respective polarization plates 32r, 32g, and 32b. Each of the three liquid crystal panels 33r, 33g, and 33b is provided on the light-entering side thereof with an optical compensation plate 34r, 34g, or 34b and a polarization plate 35r, 35g, or 35b for cutting off unwanted components of incident light.

In this way, the blue light reflected by the first dichroic mirror 20 and the field mirror 22, and directed to the light-entering polarization plate 35b, is led to the color compounding prism 31 via the light-entering polarization plate 35b, optical compensation plate 34b, liquid crystal panel 33b, and light-emerging polarization plate 32b for blue light. The green light reflected by the second dichroic mirror 21 to the light-entering polarization plate 35g is led to the color compounding prism 31 via the light-entering polarization plate 35g, optical compensation plate 34g, liquid crystal panel 33g, and light-emerging polarization plate 32g for green light. In a similar manner, the red light that has passed through the first dichroic mirror 20 and the second dichroic mirror 21 and reflected by the two field mirrors 23 and 24, respectively, to the light-entering polarization plate 35r is led to the color compounding prism 31 via the light-entering polarization plate 35r, optical compensation plate 34r, the liquid crystal panel 33r, and light-emerging polarization plate 32r for red light.

The three RGB imaging lights led to the color compounding prism 31 are compounded by the color compounding prism 31, forming a tricolor imaging light which is projected onto a front screen through the projection lens 3.

Figure 4:
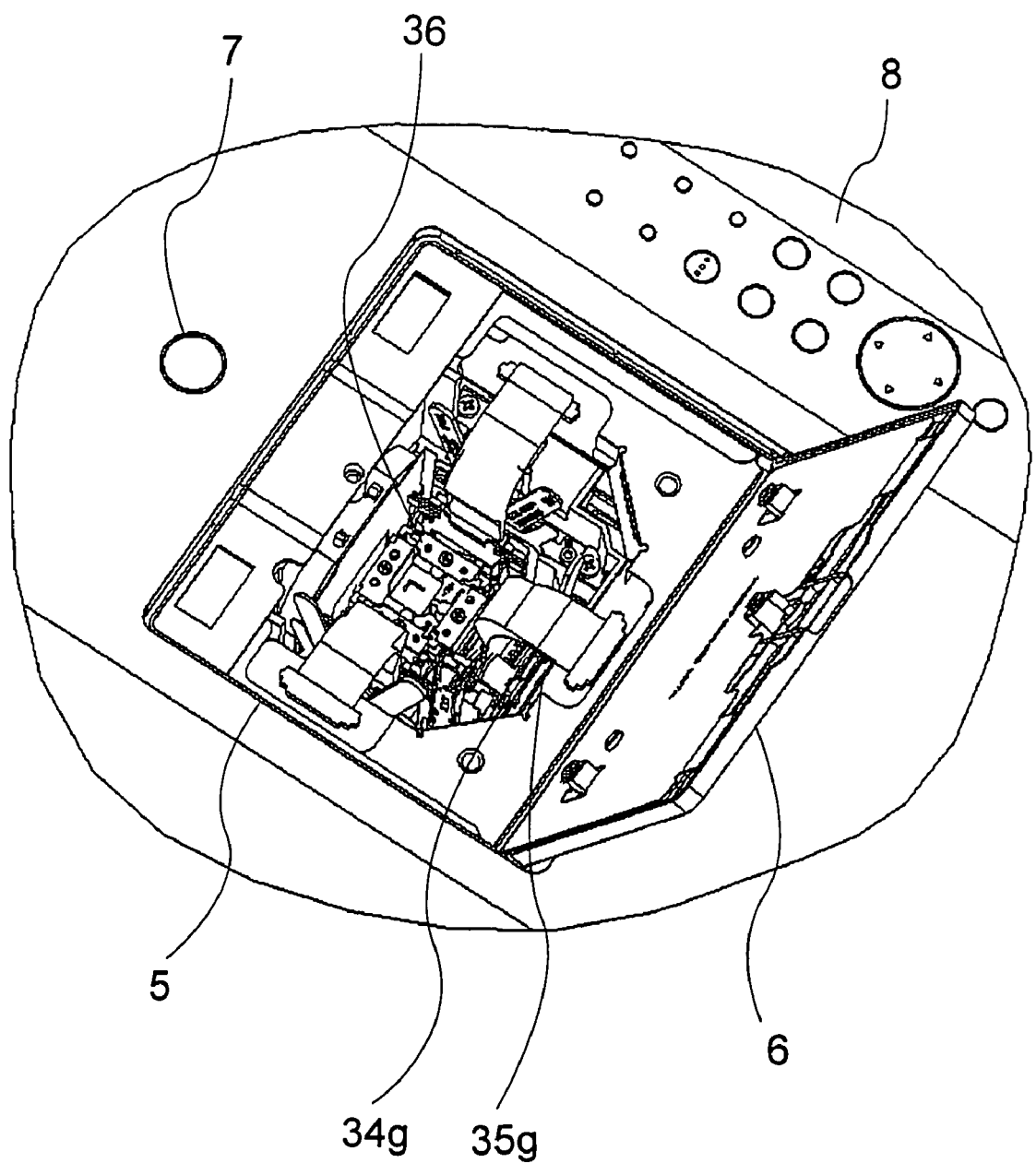
FIG. 4 is a perspective view of a relevant portion of the projector with the lid open.

The color compounding prism 31 and the respective liquid crystal panels 33r, 33g, and 33b, light-emerging polarization plates 32r, 32g, and 32b are integrally coupled in the form of a unitary prism assembly 36 (FIGS. 6 and 7) that can be detachably mounted on the base. On the other hand, the light-entering polarization plates 35r, 35g, and 35b and optical compensation plates 34r, 34g, and 34b are individually detachable. As shown in FIG. 4, the prism assembly 36, light-entering polarization plates 35r, 35g, and 35b, and optical compensation plates 34r, 34g, and 34b are directly accessible for maintenance by opening the lid 6 of the maintenance opening 5.

Figure 5:
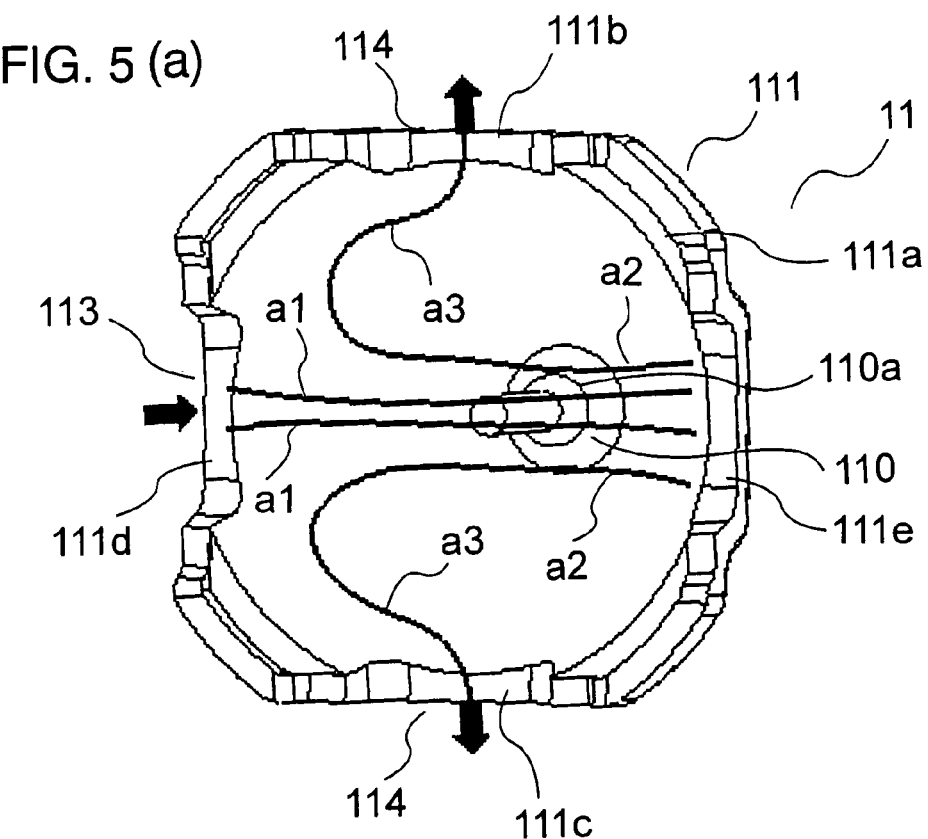
FIG. 5 shows an arrangement and functions of a relevant portion of a light source unit in accordance with one embodiment of the invention.
Figure 5:
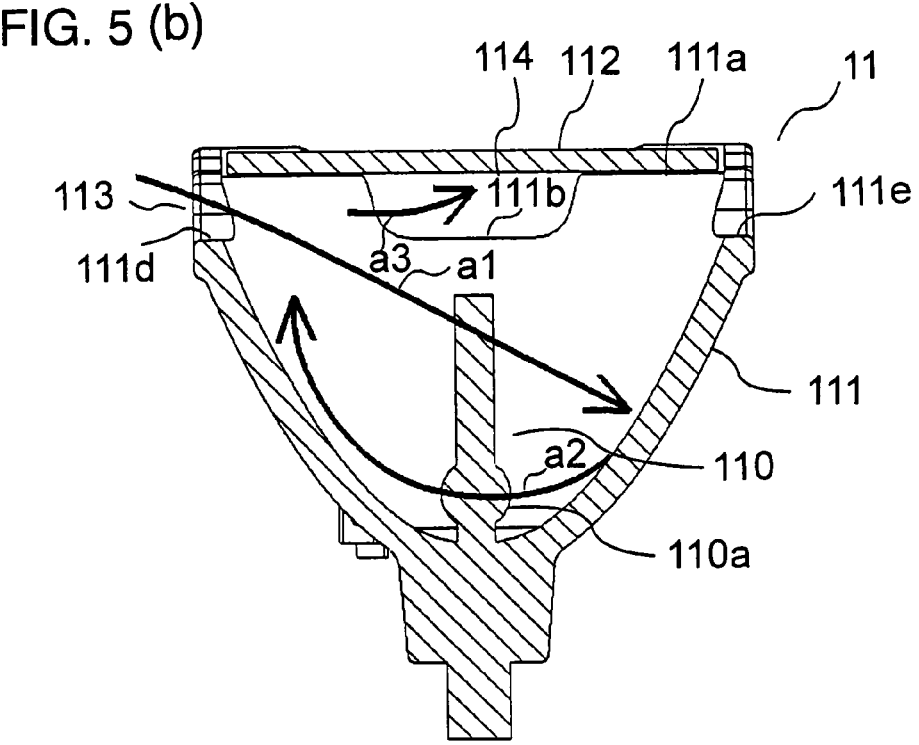

FIG. 5 shows an arrangement and functions of the light source unit in accordance with the embodiment. More particularly, FIG. 5a shows the front opening in oblique perspective view as viewed from a slightly right position thereto, and FIG. 5b is a side-elevation of the light source unit 11. Arrows indicates flow of cooling air.

The light source unit 11 of this embodiment has: an arc tube 110 such as a high-pressure mercury lamp; a reflector 111 that is configured to cover the arc tube 110 but has an opening in the front end thereof and has a concaved parabolic reflective surface on the rear inner surface thereof; and a transparent heat-resistive glass plate 112 for covering the front opening of the reflector 111. In the base section of the arc tube 110, the arc tube 110 has a generally spherical light emitting section 110a, which has a pair of discharge electrodes for emitting light.

To facilitate ventilation, the reflector 111 has four cutaway sections 111b-111e formed in the opposing horizontal and vertical sides thereof and along the periphery of the front opening, so that the cutaway sections are angularly spaced apart through equal angles (90 degrees), as shown in FIG. 5(a). In this embodiment, the cutaway section 111d in the left side of the reflector 111 serves as an air inlet port 113, while the cutaway section 111e that opposes the inlet port 113 is closed. The opposing cutaway sections 111b and 111c in the upper and lower sides serve as outlet ports 114.

It is noted that because the two outlet ports 114 are angularly offset from each other through an angle of 90° with respect to the inlet port 113, the cooling air entering the inlet port 113 flows across the tip of the arc tube 110 and hits the opposite closed inner surface of the reflector 111, as shown by arrows a1. Since the front opening 111a and the cutaway section 111e are closed, the cooling air then flows past the light emitting section 110a of the arc tube 110, as shown by arrows a2, and then towards the outlet ports 114, as shown by arrows a3. Thus, the cooling air will uniformly cool the regions surrounding the arc tube 110, without stagnating in the reflector 111. This arrangement ensures uniform cooling, at low cost, of the light source unit 11 installed at any angular position.

As described above, the cooling air is circulated without stagnating in the reflector 111 of the light source unit 11, which ensures cooling of the tip of the arc tube 110, light emitting section 110a, and the area adjacent the front opening 111a, and makes it easy to regulate the temperature of the arc tube 110, thereby permitting the light source unit 111 to be installed at any angular position, eliminating at low cost the angular limitation in the installation of the liquid crystal projector 1.

It is also noted that the outlet ports 114 are offset from each other through an angle of about 90° with respect to the inlet port 113, so that they are located intermediate between the inlet port 113 and the opposite closed inner surface of the reflector 111. As a consequence, the circulation of the cooling air in the reflector 111 will be much enhanced, without stagnation, before the air is exhausted therefrom.

Although the outlet ports 114 of the embodiment are shown to be angularly offset to each other on the opposite sides of the inlet port 113 through an angle of about 90°, similar cooling effect can be anticipated if the outlet ports 114 are offset through an angle other than 90°.

Figure 6:
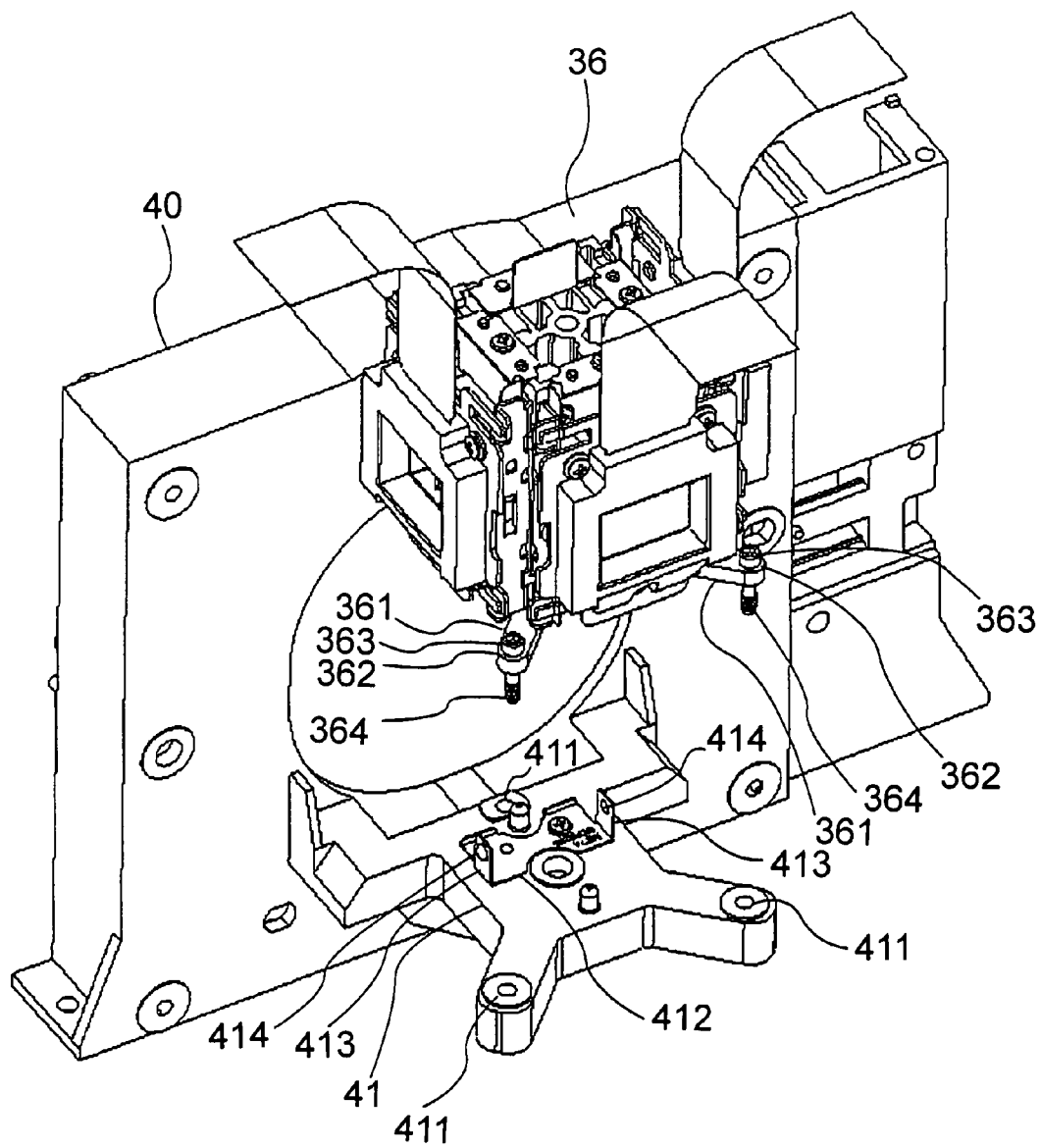
FIG. 6 is an exploded perspective view of the prism assembly as viewed from an upper oblique position, showing how the prism assembly is mounted.
Figure 7:
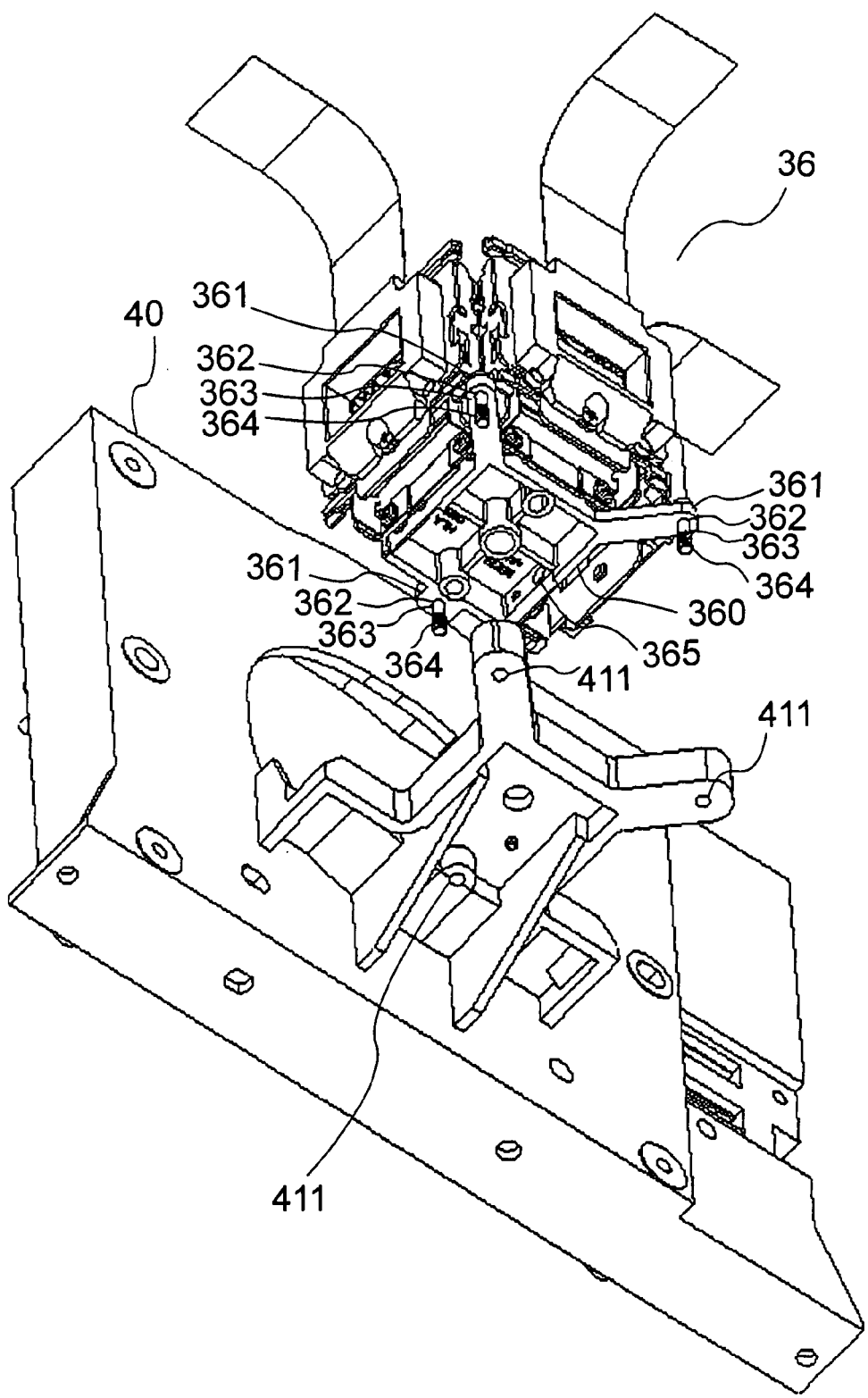
FIG. 7 is an exploded perspective view of the prism assembly as viewed from a lower oblique position.
Figure 8:
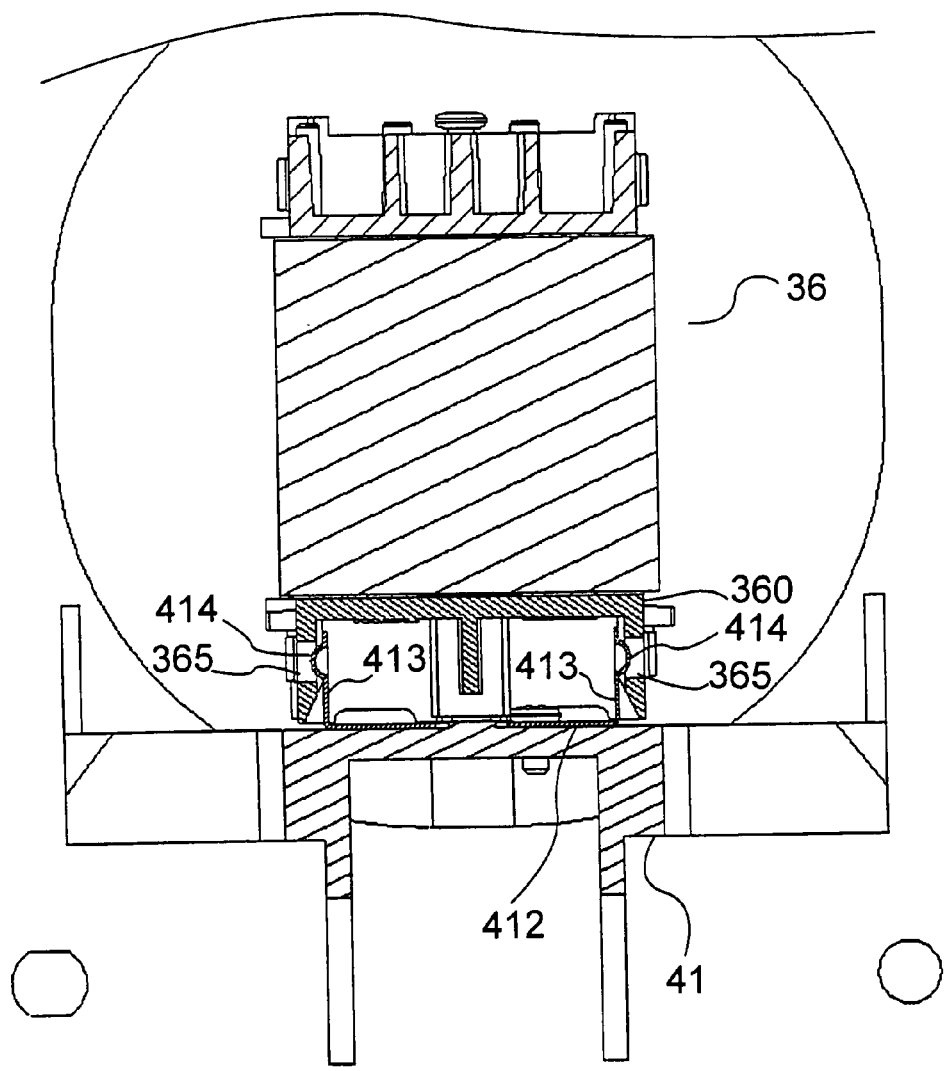
FIG. 8 is a vertical cross sectional view of a relevant portion of the prism assembly mounted.

Referring to FIGS. 6 through 9, there is shown the arrangement of the above described prism assembly mounted in the projector. In particular, FIG. 6 is an exploded perspective view as viewed from an oblique upper position; FIG. 7, an exploded perspective view as viewed from an oblique lower position; FIG. 8, a longitudinal cross sectional view of a relevant portion of the prism assembly mounted; and FIG. 9, an enlarged view of a relevant portion of the prism assembly shown in FIG. 8.

The prism assembly 36 is firmly fixed to the mount section 41 that extends inwardly from the base 40 by inserting fixing screws 363 in the through-holes 362 formed in the tripod sections 361 extending from a plinth 360 provided at the bottom of the prism assembly 36 in three directions, and screwing them into three corresponding female screw sections 411 formed in the mount section 41. The base 40 accommodates a projection lens moving mechanism as described in detail below.

Mounted on the mount section 41 are a pair of elastic members (e.g. blade springs) 412 each having an upright engagement section 413 which are spaced apart from each other at a predetermined distance (FIG. 8). Each of the engagement members 413 has a semi-spherical, outwardly protruding portion (hereinafter referred to as protrusion) 414.

On the other hand, the bottom section of the plinth 360 of the prism assembly 36 is provided with opposing walls that defines a hollow space therebetween. These walls are formed with engagement bores 365 for receiving the protrusions 414 of the respective elastic engagement members 413 (FIG. 9).

Thus, the pair of upright elastic engagement members 413 are mounted upright on the mount section 41 spaced apart at a distance equal to the distance between the inner walls at the bottom of the plinth 360. These engagement members 431 have sufficient elasticity to allow them to be removed therefrom when the prism assembly 36 is pulled out with a force that exceeds the weight of the prism assembly 36.

Each of the fixing screws 363 is threaded only at the end portion thereof serving as a male screw 364 that engages with the female screw sections 411 formed in the mount section 41. Each of the through-holes 362 of the prism assembly 36 is threaded (not shown) so as to engage the male screw 364, while permitting the screw 363 to penetrate through it.

Figure 9:
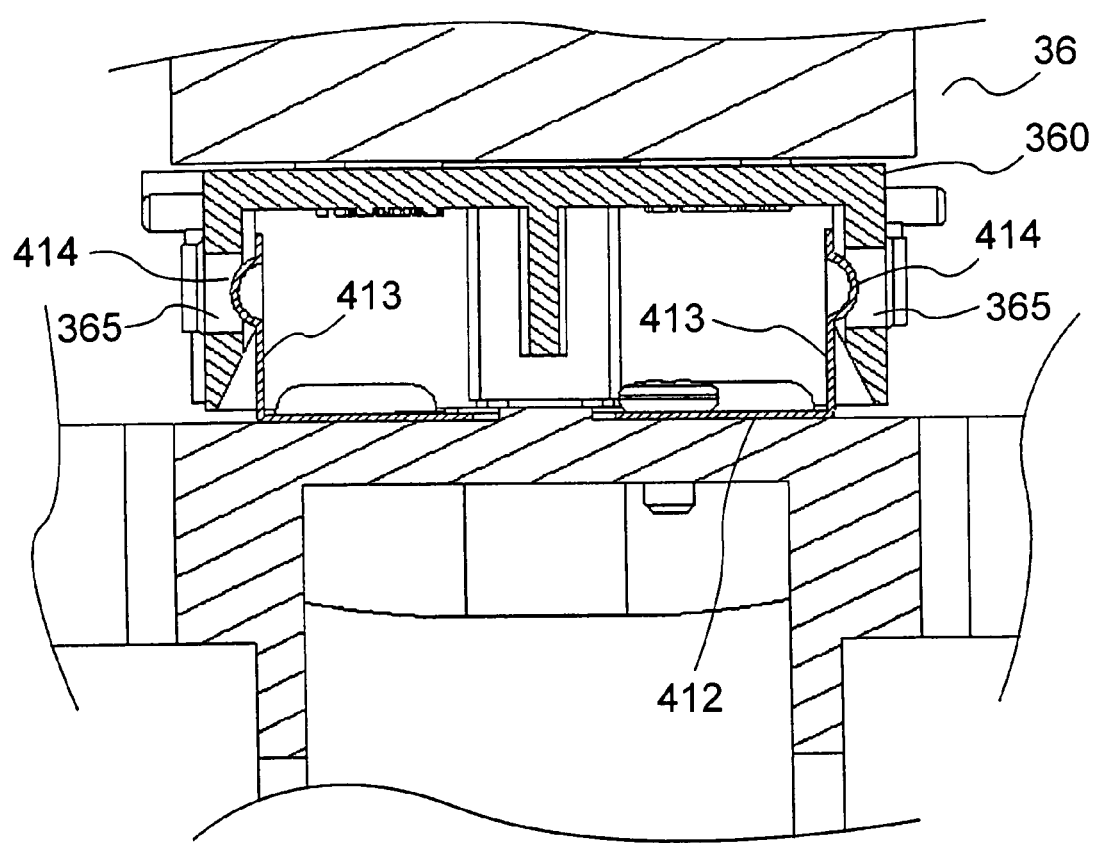
FIG. 9 is an enlarged view of a relevant portion of the prism assembly.

In this arrangement, to mount the prism assembly 36, the plinth 360 is positioned correctly above the mount section 41 and pushed against it, which causes the elastic protrusions 414 of the engagement members 413 to be force fitted in the engagement bores 365 of the plinth 360, as shown in FIGS. 8 and 9, thereby temporarily holding the prism assembly on the mount section 41. Under this condition, via threaded through-holes 362 of the prism assembly 36, the fixing screws 363 are screwed into the female screw sections 411 formed in the mount section 41 until the prism assembly 36 is securely fixed to the mount section 41.

On the other hand, to dismount the prism assembly 36 from the mount section 41 of the liquid crystal projector 1 suspended upside down from a ceiling for example, the lid 6 of the maintenance opening 5 is opened, and the fixing screws 363 are removed from the female screw sections 411 with a screw, as shown in FIG. 4. It is noted here that the prism assembly 36 will be still held on the mount section 41 by the elastic engagement members 413 exerting a supportive force larger than the weight of the prism assembly, that is, it will not drop from the mount section 41 if not supported by hand, even after all the fixing screws 363 are removed. However, the prism assembly 36 can be easily dismounted from the mount section 41 by pulling it by hand after all the fixing screws 363 are removed. Thus, the prism assembly 36 of the suspended liquid crystal projector 1 can be easily replaced. This feature greatly improves the maintenance efficiency.

It should be appreciated that the fixing screws 363 can be dismounted merely from the female screw sections 411 when they are unscrewed with a screw driver and can remain in the respective through-holes 362. Therefore, there is no need to remove any one of them from the through-holes 362 before unscrewing the next from its female screw section 411, which facilitates further improvement in the working efficiency of the maintenance.

It should be also appreciated that the above-described technique when application to the prism assembly 36 incorporating the liquid crystal panels 33r, 33g and 33b and light-emerging polarization plates 32r, 32g, and 32b which are integrated with the color compounding prism 31, enables easy and efficient replacement of these parts of the display apparatus suspended upside down from a ceiling.

It will be recalled that in the embodiment shown and described above the elastic engagement members 413 are provided on the mount section 41 while the engaging bores 365 are formed in the prism assembly 36 to fit the protrusions 414 of the engagement members 413. However, the elastic engagement members can be alternatively provided on the prism assembly 36 and the protrusions on the mount section 41 to obtain the same result, since the elastic engagement members are needed only either one of the mount section 41.

Figure 10:
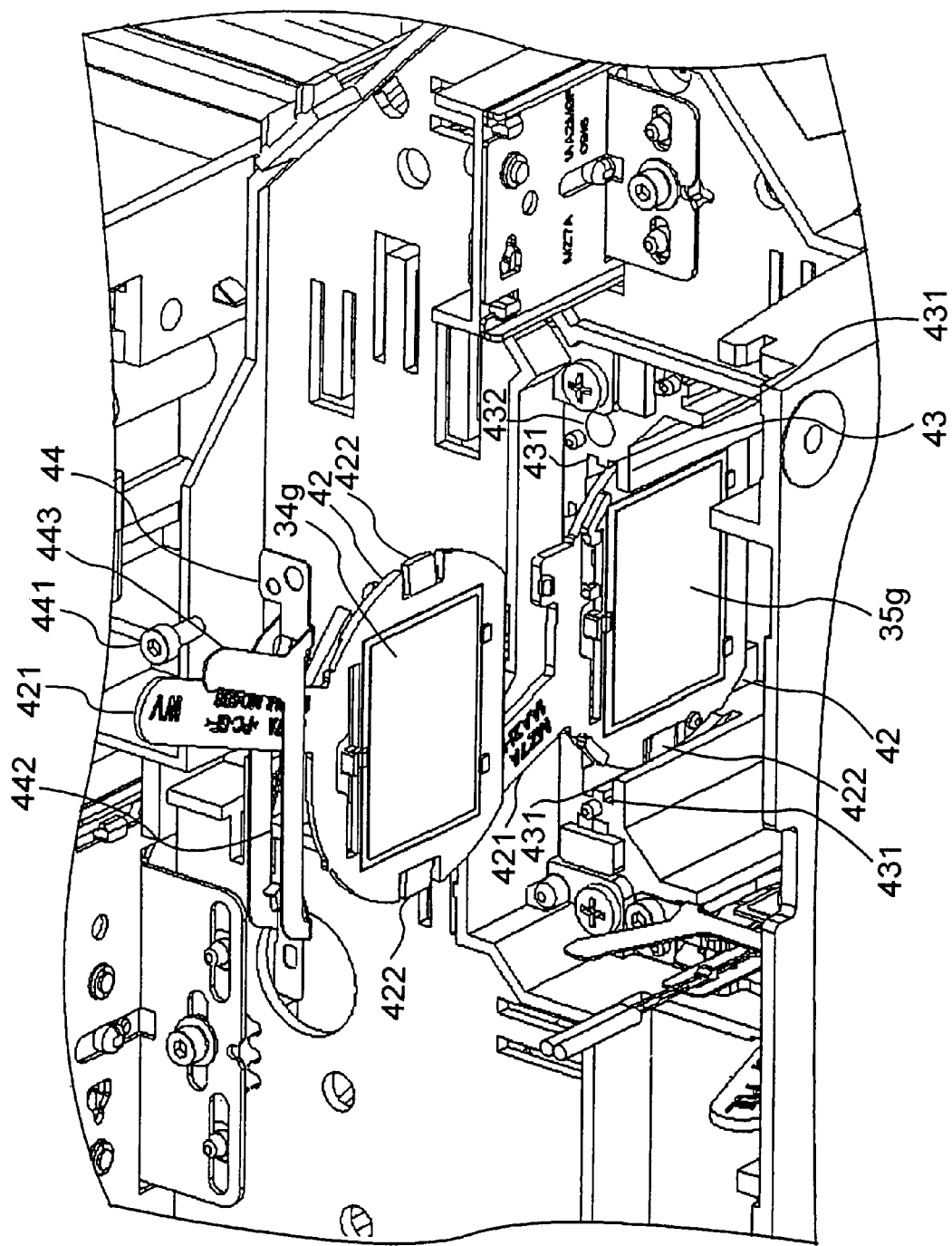
FIG. 10 is another exploded perspective view of a relevant portion of the prism assembly as viewed from an upper oblique position, showing a light-entering polarization plate and an optical compensation plate mounted in position.
Figure 11:
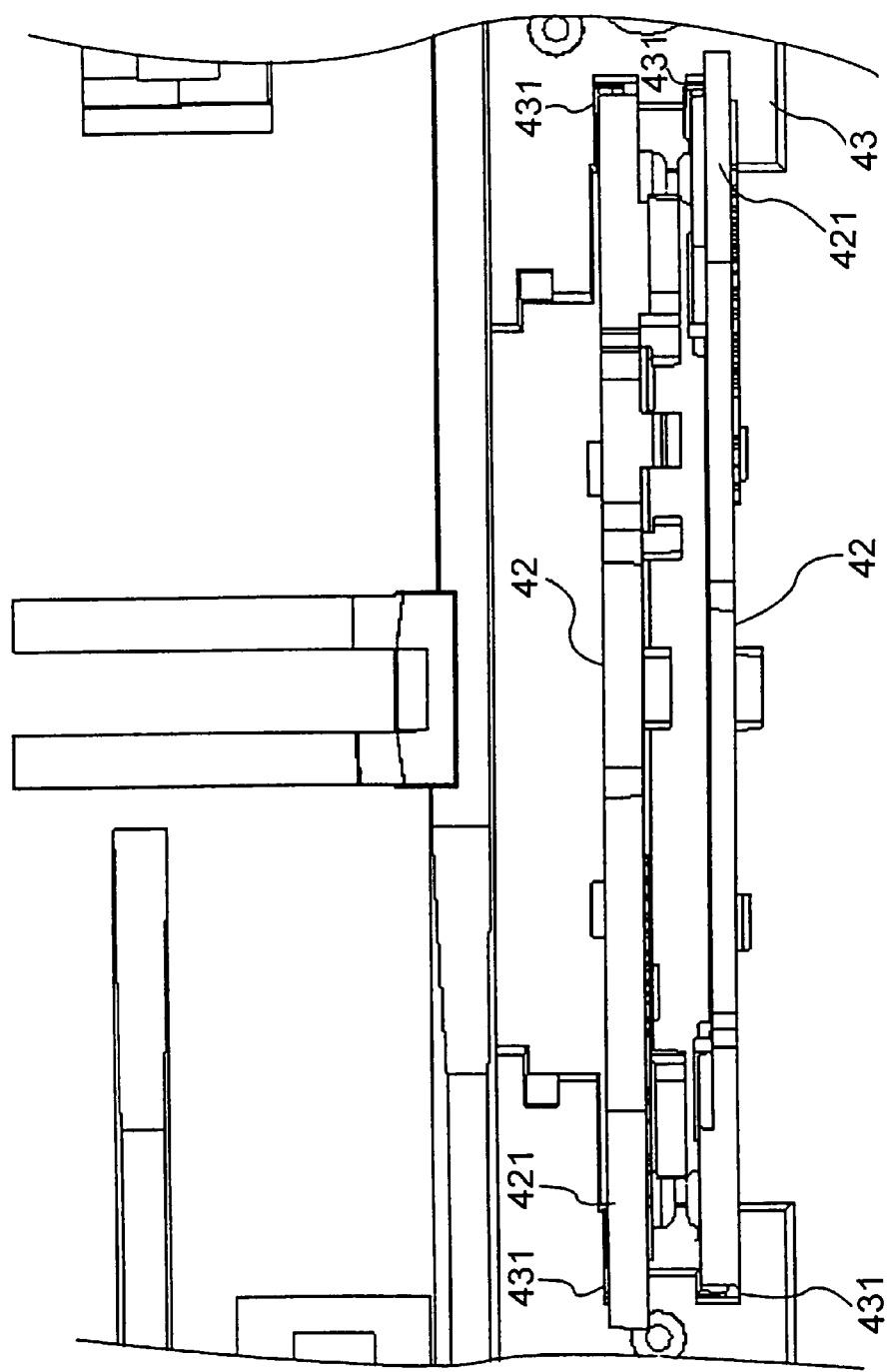
FIG. 11 is a partial plan view showing adjustment members mounted on the prism assembly.
Figure 12:
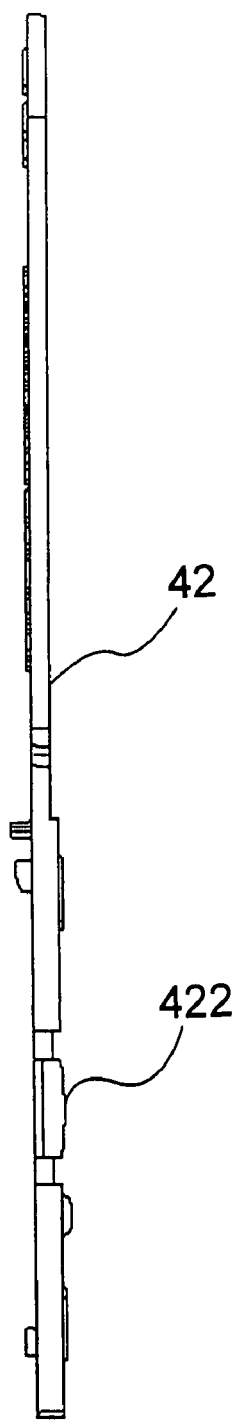
FIG. 12 is a side-elevational view of an adjusting member on which a light-entering polarization plate and an optical compensation plate are mounted.
Figure 13:
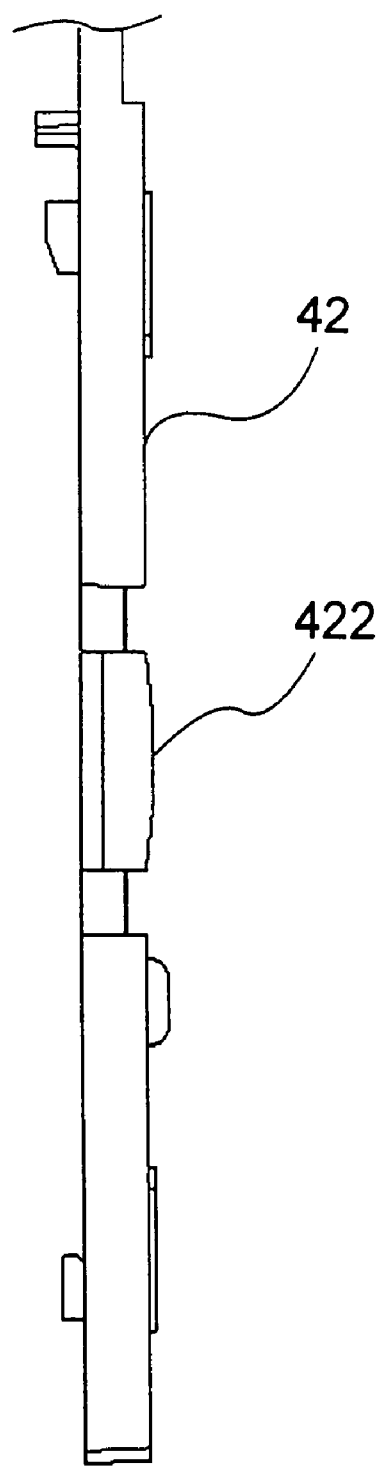
FIG. 13 is an enlarged plan view of a relevant portion of the adjusting member.

Referring to FIGS. 10-13, there is shown an arrangement of the light-entering polarization plates 35r, 35g, and 35b and the optical compensation plates 34r, 34g, and 34b mounted for the respective liquid crystal panel 33r, 33g, or 33b. Particularly, FIG. 10 is an exploded oblique perspective view of the prism assembly as viewed from an upper oblique position. FIG. 11 is a plan view of a relevant part of the prism assembly. FIG. 12 is a side-elevational view of an adjusting member 42 bearing thereon one light-entering polarization plate 35r, 35g, or 35b or one optical compensation plate 34r, 34g, or 34b. FIG. 13 is an enlarged view of a relevant portion of the adjusting member 42 shown in FIG. 12. The adjustment members are provided to adjust the angular positions of the polarization plates and the optical compensation plates. In what follows only the light-entering polarization plate 35g and the optical compensation plate 34g for green light will be described, but similar descriptions will apply to red and blue lights.

As shown in FIG. 10, the light-entering polarization plate 35g and optical compensation plate 34g are mounted on the respective adjusting members 42 made of a substantially disk-shaped plastic plate. The opposite portions of the periphery of the adjusting members are inserted in the respective mounting grooves 431 formed in the opposing walls of a mount section 43 of the prism assembly 36. An adjusting member stopper 44 is mounted on the mount section 43 by means of a fixing screw 441 screwed into the female screw section 432 formed in the upper end of the mount section 43. Formed on each of the adjusting members 42 is a handgrip 421. Formed in the adjusting member stopper 44 is an elongate hole 442 for exposing the upper end and the handgrip 421 of the adjusting member 42. The adjusting member stopper 44 is also provided with a handgrip 443 for gripping the stopper 44.

In this embodiment, two engagement members 422 made of a resilient resin are formed at opposite portions of the periphery of a substantially circular disk-shaped adjusting member 42. Each of the engagement members 422 is slightly bent or incurved. The engagement members 422 have sufficient elasticity for detachably holding in position the adjusting members 42 that incorporate the light-entering polarization plate 35g and the polarization plate 34g such that they permit each adjusting member 42 to be detached when a pulling force that exceeds its weight is applied thereto. The incurved face of the respective engagement section 422 has an inwardly concaved surface having a substantially constant radius of curvature as shown in FIGS. 12 and 13 so that it does not interfere the mount section 43 as it is inserted into the mounting grooves 431 associated with it.

In this arrangement, to mount an adjusting member 42 with a light-entering polarization plate 35r, 35g, or 35b or an optical compensation plates 34r, 34g, or 34b mounted thereon, the adjusting member 42 is inserted into the mounting groove 431 of the mount section 43 associated with it, and forced therein so as to fit the elastic engagement members 422 in the mounting groove 431 of the mount section 43, so that the adjusting member 42 is temporarily held in position, as exemplified by the adjusting member 42 bearing thereon the polarization plate 35g as shown in FIG. 10. The next adjusting member 42 with an optical compensation plate mounted thereon is inserted into another mounting groove 431 in the same way, as exemplified by the adjusting member 42 bearing thereon the optical compensation plate 34g as shown, after which an adjusting member stopper 44 is set on top of the mount section 43 in such a way that the two handgrips 421 of the two adjusting members 42 penetrate through the elongate bore 442 of the stopper 44. The two adjusting members 42 respectively bearing thereon the light-entering polarization plate 35g and the optical compensation plate 34g are thus firmly fixed on the mount section 43 by tightening the fixing screw 441 in the female screw section 432 formed in the mount section 43.

On the other hand, to dismount an adjusting member 42 bearing thereon a light-entering polarization plate 35r, 35g, or 35b and an optical compensation plate 34r, 34g, or 34b from the liquid crystal projector 1 installed upside down on a ceiling for example, the lid 6 of the maintenance opening 5 is opened, and the adjusting member stopper 44 is removed by removing the fixing screw 441 using a screw driver. Since the adjusting member stopper 44 is secured by only one fixing screw 441, it can be easily removed by pulling the handgrip 443 after the screw 441 is removed. However, even after the adjusting member stopper 44 is removed, the adjusting member 42 bearing thereon the polarization plate 35g and the optical compensation plate 34g will not fall off but will be temporarily secured in position by the elastic forces exerted by the elastic engagement members 422, since the forces exceed the weight of the adjusting member 42. Nevertheless, after removing the adjusting member stopper 44, the adjusting member 42 can be easily dismounted manually by pulling the handgrip 421 of the adjusting member 42. Thus, it is possible to replace any one of the light-entering polarization plates 35r, 35g, and 35b and the optical compensation plates 34r, 34g, and 34b quite easily while leaving the liquid crystal projector 1 installed upside down as it is, thereby greatly improving the working efficiency of the maintenance.

Moreover, because the planar resin adjusting members 42 for bearing thereon the light-entering polarization plates 35r, 35g, and 35b and the optical compensation plates 34r, 34g, and 34b are provided with elastic engagement members 422 which are made of a resilient resin and forcibly mounted in the mounting grooves 431 of the mount section 43, the maintenance capabilities of the light-entering polarization plates 35r, 35g, and 35b and the optical compensation plates 34r, 34g, and 34b are greatly enhanced at low cost.

In this way, by constructing the liquid crystal projector as described above, a liquid crystal projector having a greatly improved maintenance efficiency can be realized in which replacement of parts can be efficiently performed if the projector is installed upside down on a ceiling.

Although the invention has been described with a particular reference to the adjusting members 42 for the light-entering polarization plates 35r, 35g, and 35b and optical compensation plates 34r, 34g, and 34b, it will be apparent to those skilled in the art that the invention can be applied in a similar way to any optical parts that are mounted via adjusting members.

Figure 14:
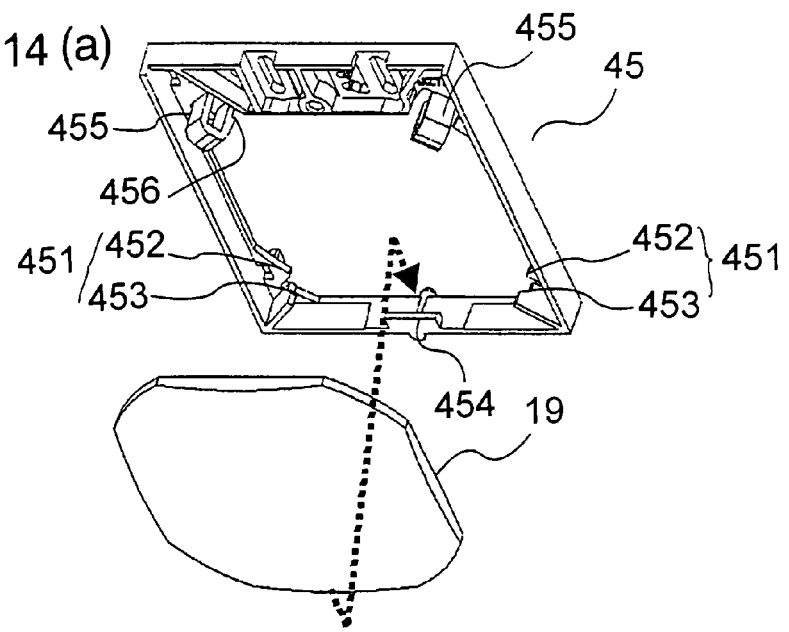
FIG. 14 is a diagram showing a configuration and functions of the adjusting member on which a lens is fixed in accordance with the embodiment.
Figure 14:
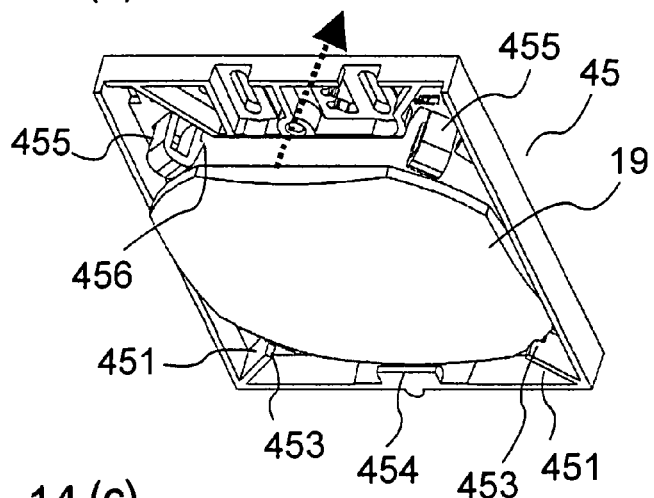
Figure 14:
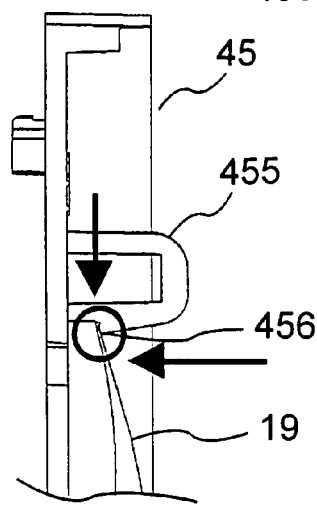

Referring to FIG. 14(a)-(c), there is shown an arrangement and functions of a lens adjusting member to which a lens is fixed. As an example, a condenser lens 19 shown in FIG. 3 will be description below. A rectangular plastic frame serving as a lens adjusting member 45 has at the two lower corners thereof two engagement members 451 for positioning the condenser lens 19, adapted to receive opposite portions of the periphery (appearing in FIG. 14) of the condenser lens 19. Each of the engagement members 451 consists of a hind wall 452 and a fore pawl 453. Also formed on the lower end of the frame 45 and at an intermediate position between the engagement members 451 is a fore pawl 454.

On the other hand, formed at the upper corners of the lens adjusting member 45 are generally U-shaped elastic engagement members 455, which inwardly project to engage the respective upper portions of the periphery of the condenser lens 19, with its lower corners fitted in the engagement members 451. These elastic engagement members 455 are each formed by deforming a resilient material into a U-shape piece. They have, on one side of the U-shape, a pawl 456 that can be deformed by the lens.

In this arrangement, to mount the condenser lens 19 on the lens adjusting member 45, one side (lower end) of the condenser lens 19 is first inserted between the wall 452 and the pawl 453 of the engagement members 451 provided at the lower end of the lens adjusting member 45, as shown in FIG. 14(a). Then, the other side (upper end) of the condenser lens 19 is forcibly slipped to the undersides of the pawls 456 provided on the undersides of the elastic engagement members 455 at the upper corners of the lens adjusting member 45, until the lens is trapped by the pawls, as shown in FIG. 14(b).

This causes the opposite upper corners of the condenser lens 19 to be engaged with the pawls 456 of the elastic engagement members 455, as shown in FIG. 14(c), whereby the lens 19 is pressed against the lens adjusting member 45 in the directions as indicated by arrows in the figure and securely fixed at the correct position.

On the other hand, to dismount the condenser lens 19 from the lens adjusting member 45, two of the elastic engagement members 455 are outwardly deformed so as to liberate the condenser lens 19 from the pawls 456. The lens 19 can be then easily removed.

Since the number of elements required to fix the lens can be as small as 1 as described above, the manufacturing as well as maintenance cost of the projector can be minimized. In addition, the maintenance of the projector can be simplified accordingly. Furthermore, no dedicated facility for fixing the lens such as welding facility is needed. Moreover, the lens adjusting member 45 and the condenser lens 19 are recyclable.

Further cost reduction can be achieved by forming the adjusting members 45, and hence the elastic engagement members 455, using a resilient resin.

Thus, on basis of the techniques as described above, it is possible to improve the maintenance efficiency, and hence reduce the maintenance cost, of the liquid crystal projector 1.

In addition, it is possible to provide a liquid crystal projector 1 whose lens adjusting members 45 and the condenser lens 19 are recyclable.

Obviously, the invention can be applied not only to a condenser lens 19 but also to different types of lenses that can be mounted on a lens adjusting member. For example, the present invention can be applied to a relay lens mounted on a lens adjusting member (not included in the optical system of FIG. 3) that is often utilized to adjust the optical path lengths for RGB components.

Figure 15A:
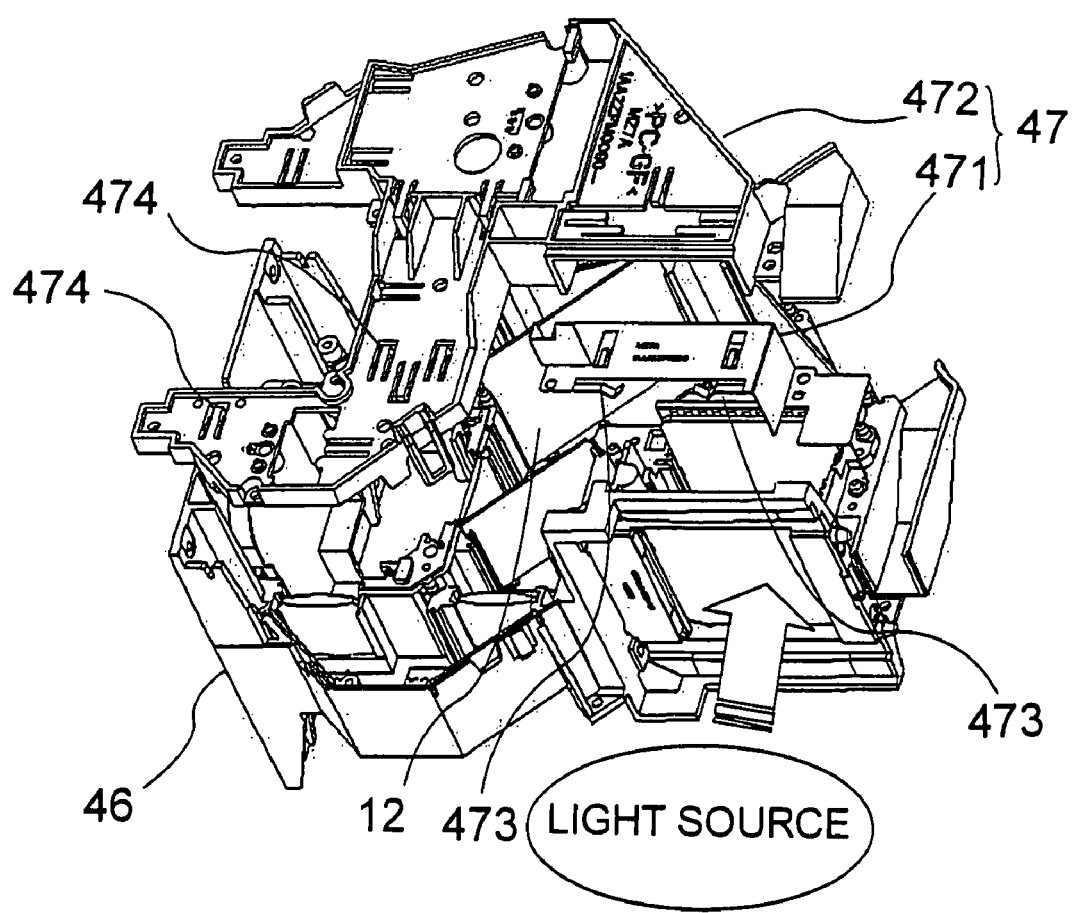
FIG. 15A is an exploded perspective view of an optical system storing for storing the optical system in accordance with one embodiment of the invention.

Referring to FIG. 15A, there is shown in exploded perspective view the structure of the casing of the optical system 12. In the example shown herein, the optical system 12 is stored in an optical system storage 46 made of a heat-resistive resin having a small thermal expansion coefficient. The optical system storage 46 has an opening in the upper end thereof in such a way that the opening is covered with a lid 47.

Conventionally, such lid would be entirely made of a heat-resistive resin, but the lid 47 of this embodiment is constituted of a first lid section 471 made from a sheet metal and located in a high-temperature region close to the light source (the first lid section referred to as metal lid), and a second lid section 472 made of a non-heat-resistive, but elastic, resin and located in a low-temperature region at a certain distance away from the light source (the second lid section referred to as resin lid). Specifically, the metal lid 471 is intended to cover only a limited region directly over the first integrator lens 14 (FIG. 3), so that the metal lid 471 needs to extend over a small area, as shown in FIG. 15A.

The metal lid 471 and the resin lid 472 respectively have clip portions 473 and 474 to serve as simple springs to easily absorb the dimensional tolerance of the optical components stored in optical storage 47. The clip portions are formed by cutting portions of the lids 471 and 472.

Figure 15B:
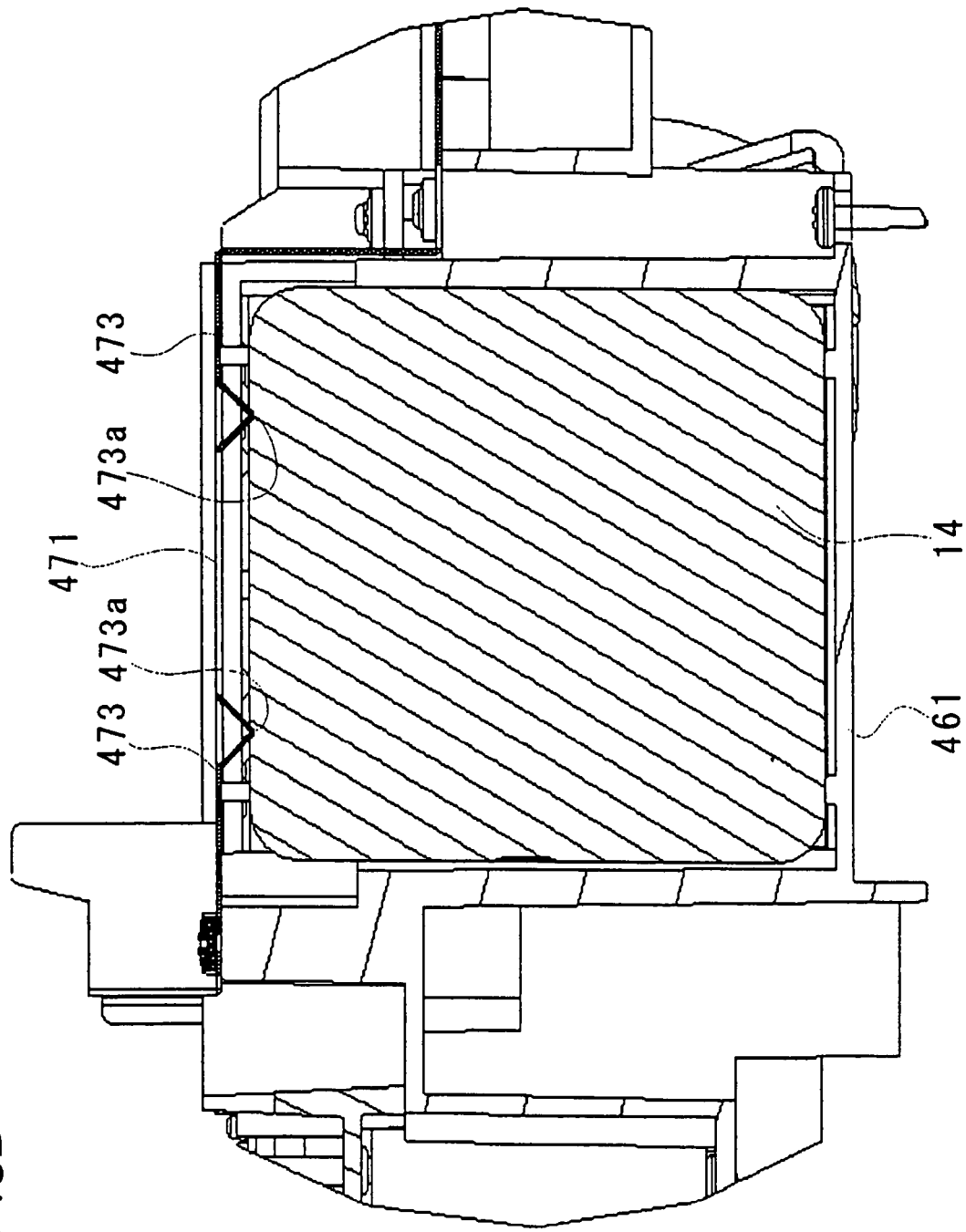
FIG. 15B is a cross sectional view of a lens held in position by a metal lid.
Figure 15C:
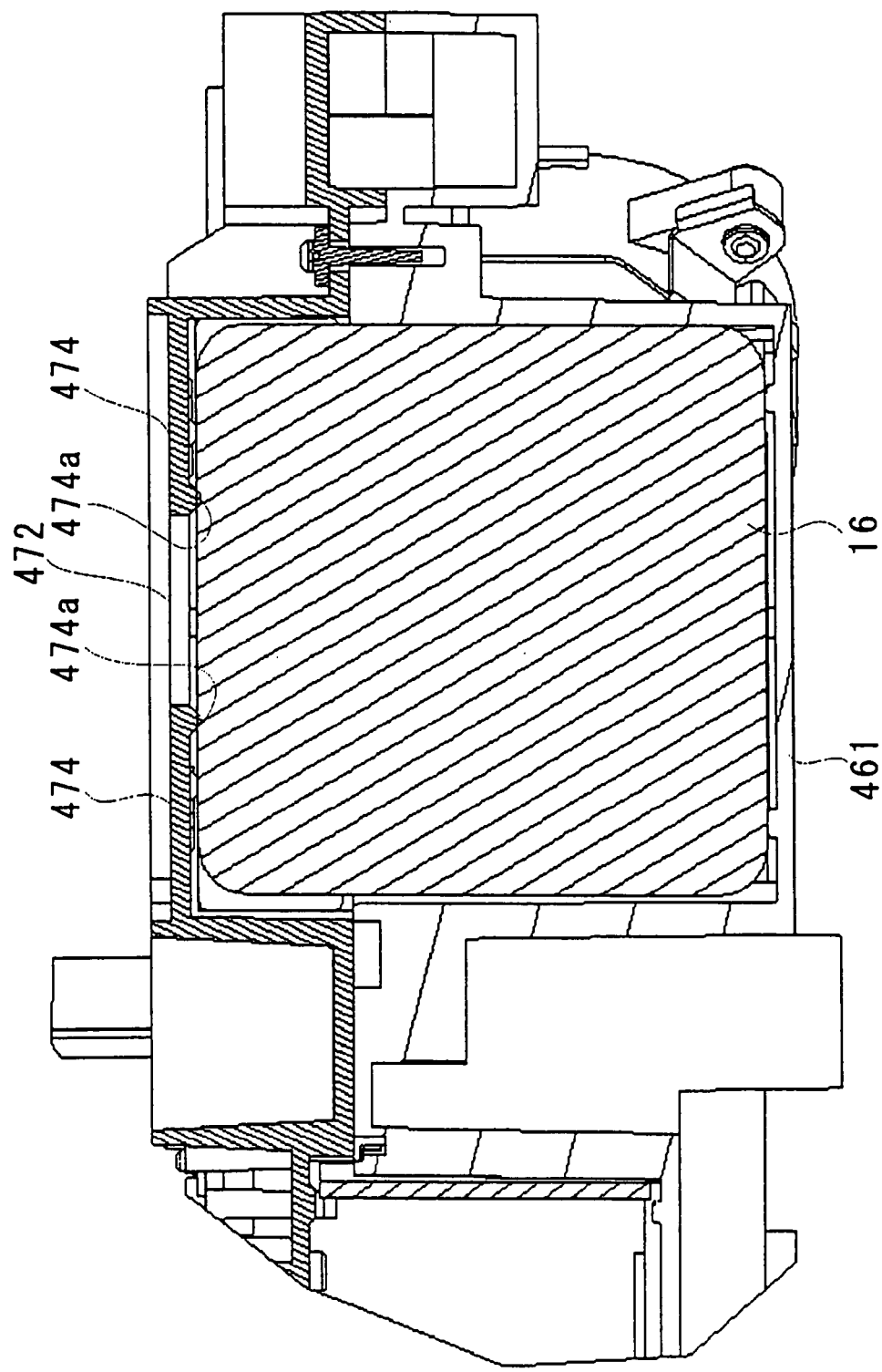
FIG. 15C is a cross sectional view of a lens held in position by a resin lid.

The lenses of the optical system 12 arranged to receive light from the light source unit 11 and project imaging light are fitted in the respective frames 461 each having an upper opening. The frames 461 and first integrator lens 14 have dimensional tolerances. The high-temperature region of the optical system storage lying between the light source unit 11 and the first integrator lens 14 is covered with an upper lid 471, which is made of a resilient metal. The metal upper lid 471 has a portion associated with the frame 461, which portion is partially split into narrow strips serving as springs 473 and their tips are bent to V-shape protrusions 473a for holding the upper end of the lens 14 fitted in the frame 461, as shown in FIG. 15B. The low-temperature region of the optical system storage, lying away from the light source unit 11, is covered with an upper lid 472 made of a resilient resin. Portions of the resin lid 472, associated with the frame 461 in the low-temperature region is split into narrow strips serving as springs 474, as shown in FIG. 15C. The tips of the springs 474 are formed with protrusions 474a for holding the upper end of, for example, the second integrator lens 16. These lids can absorb dimensional tolerances of the lenses and frames 461, thereby enabling secure and accurate fixation of the lenses in the frames.

Thus, there is no need of independent parts for fixing the optical elements, which helps minimize the number of parts and manufacturing steps. Further, there is no need of costly heat-resistive resin to make the lid 47, which helps reduce the cost of the projector, accordingly.

Figure 16A:
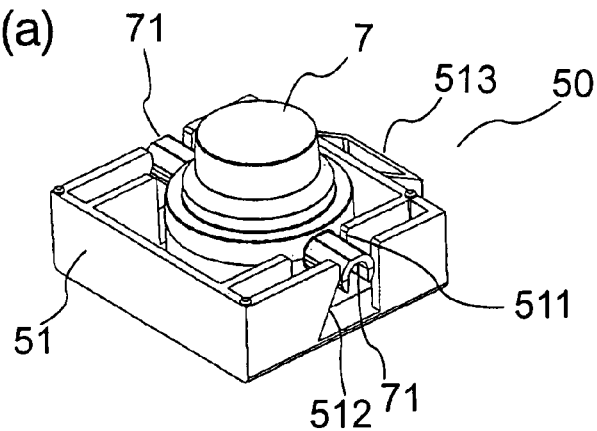
FIG. 16 is a diagram showing the arrangement and functions of a projection lens removal mechanism in accordance with the embodiment.

Referring to FIG. 16, there is shown an arrangement and functions of a projection lens removal mechanism 16. FIG. 17 is an exploded perspective view of a lens mounting mechanism for the projection lens 3.

The lens mounting mechanism for the projection lens 3 of FIG. 17 has a mount section 49 and is adapted, in the same manner as conventional ones, to receive the projection lens 3 when screwed therein like an ordinary camera lens. The lens 3 can be fixed in position by a restriction pin for stopping the rotation of the lens 3 mounted. Provided on top of the mount section 49 is a push button 48 for releasing the restriction pin. In this embodiment, the projection lens removal mechanism 50 shown in FIG. 16 is provided above the projection lens 3 and adjacent the push button 48, as shown in FIG. 2.

As seen in FIG. 16, the projection lens removal mechanism 50 has: a projection lens removal button 7 whose top end is exposed out of the upper end of the casing 1, as shown in FIG. 1; a frame 51 surrounding the projection lens removal button 7; and an elastic member 52 in the form of a coiled spring for upwardly urging the projection lens removal button 7. The projection lens removal button 7 is provided on the opposite sides thereof with two generally cylindrical, protruding sliding members 71. On the other hand, the frame 51 is provided with: a first inclined surface 511 on which one side of the sliding member 71 of the projection lens removal button 7 can slide; a second inclined surface 512 on which the other side of the sliding member 71 can slide; and a pressure member 513 for pressing the push button 48 provided on the upper section of the mount section 49, as shown in FIG. 17. Together with the sliding member 71, the frame 51 and the first inclined surface 511 form a cam-follower mechanism, and the elastic member 52 and the second inclined surface 512 of the frame 51 form a return cam-follower mechanism.

Figure 16B:
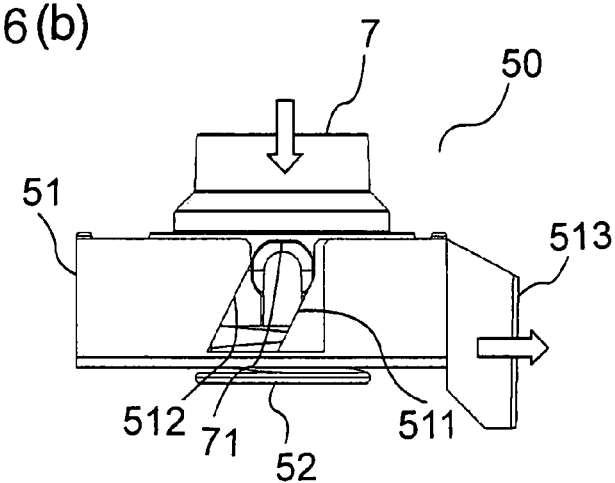
Figure 17:
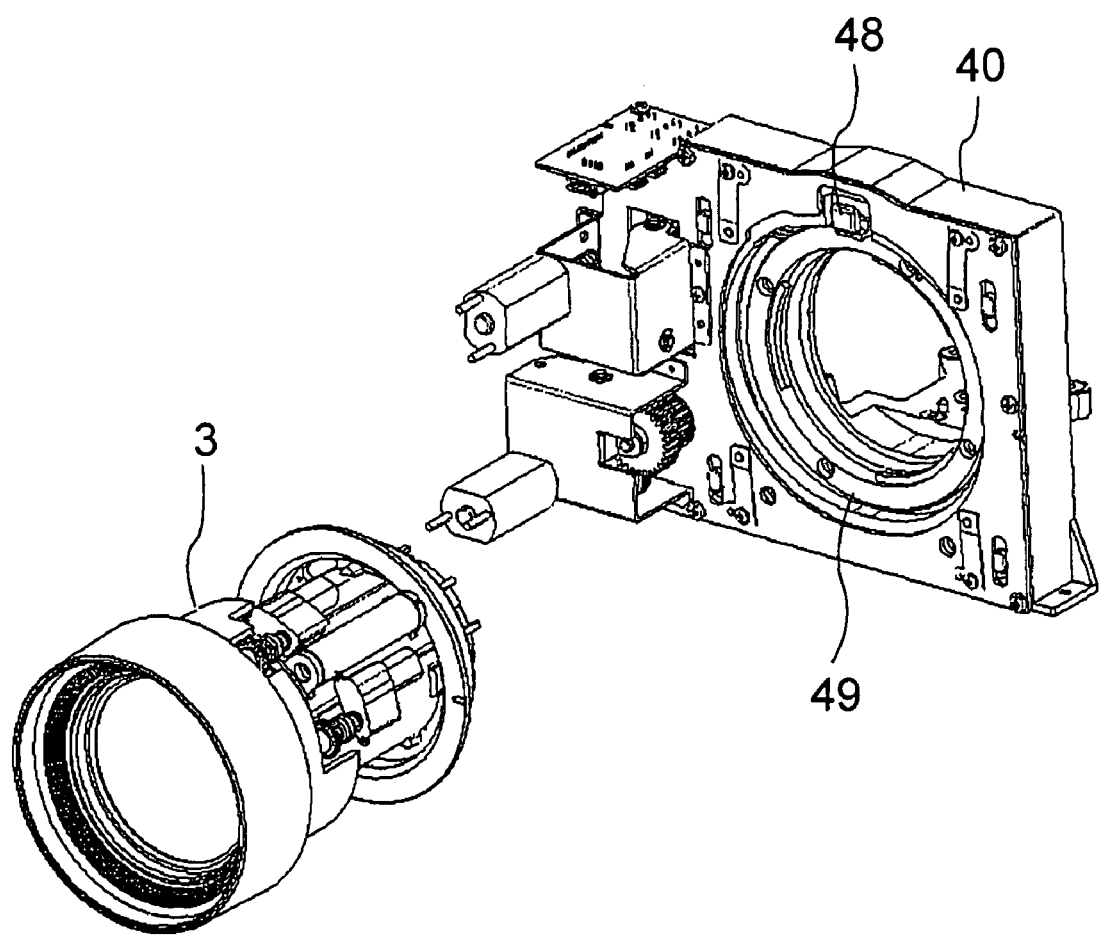
FIG. 17 is an exploded perspective view of a mounting mechanism of the projection lens.

In the above described arrangement, when the projection lens removal button 7 appearing in the top end of the casing 1 is pushed downward, as shown in FIG. 16(b), the sliding members 71 provided on the button 7 slides on the first inclined surface 511 provided on the frame 51 downward, which causes the frame 51 to move in the direction perpendicular to the downward movement of the button 7, which in turn causes the pressure member 513 to push the push button 48. As a consequence, the fixing pin of the projection lens 3 mounted on the mount section 49 is released, whereby the projection lens 3 can be dismounted by unscrewing it.

Figure 16C:
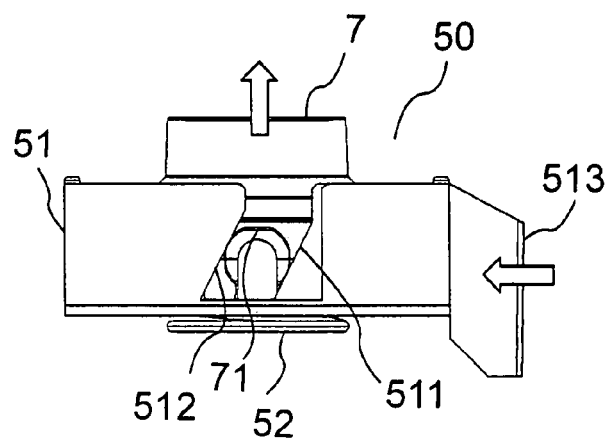

After the projection lens 3 is removed, the projection lens removal button 7 is automatically returned to its home position by the restoring force of the elastic member 52 provided at the lower section of the button 7. At the same time, the frame 51 is also returned to its home position in response to the sliding motion of the sliding members 71 on the second inclined surface 512, as shown in FIG. 16(c).

Thus, the projection lens removal button 7 can be provided in the most convenient manner, protruding in the upper end of the casing 1 and operable in the direction perpendicular to the movement of the push button 48.

The projection lens removal button 7 and frame 51 are automatically returned to their original positions following the operation of the projection lens removal button 7. As a result, only a minimum number of parts are required to effect the cam-follower movement as well as the return cam-follower movement for the push button 48.

It should be understood that if the push button 48 is provided with sufficient restoring power, such a return mechanism as described above can be omitted.

Figure 18:
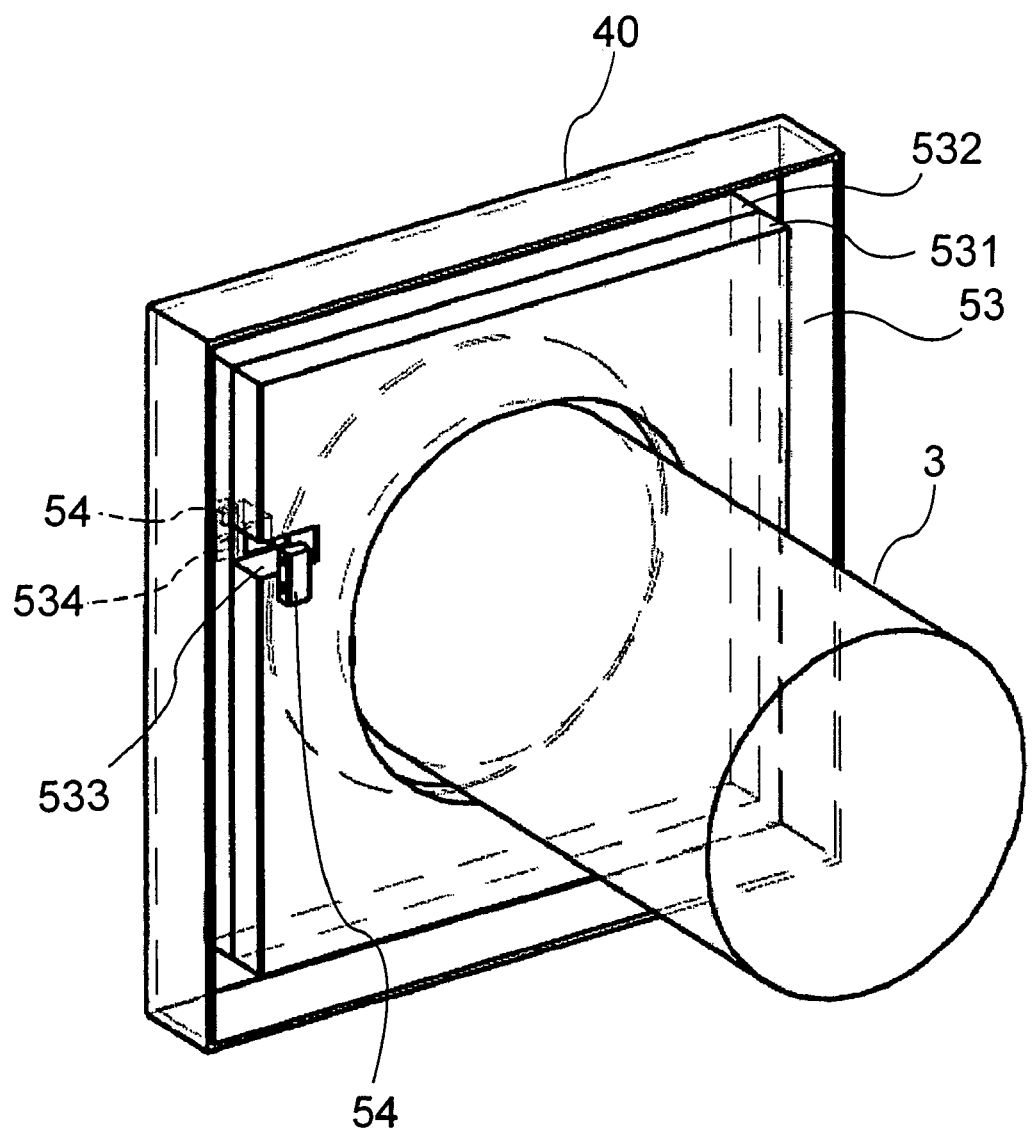
FIG. 18 is a perspective view of a relevant portion of a projection lens moving mechanism in accordance with the embodiment.

Referring to FIG. 18, there is shown in perspective view an arrangement and functions of a relevant portion of the projection lens moving mechanism. This projection lens moving mechanism 53 is constituted of a vertically moveable member 531, a horizontally moveable member 532, and a drive mechanism (described below but not shown) for driving these moveable members, all accommodated in the base 40. In the arrangement shown herein, the projection lens 3 is mounted on the horizontally moveable member 532, so that it will be horizontally moved when the horizontally moveable member 532 is driven in the horizontal directions. When the vertically moveable member 531 is driven in the vertical directions, the horizontally moveable member 532 is also moved in the same direction, thereby effecting the same vertical movement of the projection lens 3.

The moveable member 531 is provided with a through-hole 533, and so is the moveable member 534 with a through-hole 534, each through-hole having a specified cross-section (e.g. quadrangle) adequate for determining limitative movement of the moveable member 531 or 532. The two through-holes communicate with each other at the interface between the moveable members 531 and 532. Provided at the respective opposite open ends of the through-holes are separate type photo-interrupters 54. In order to allow the horizontally moveable member 532 to undergo horizontal movements independently of the vertically moveable member 531, the latter moveable member 531 is provided with an elongate horizontal through-hole 533.

Figure 19:
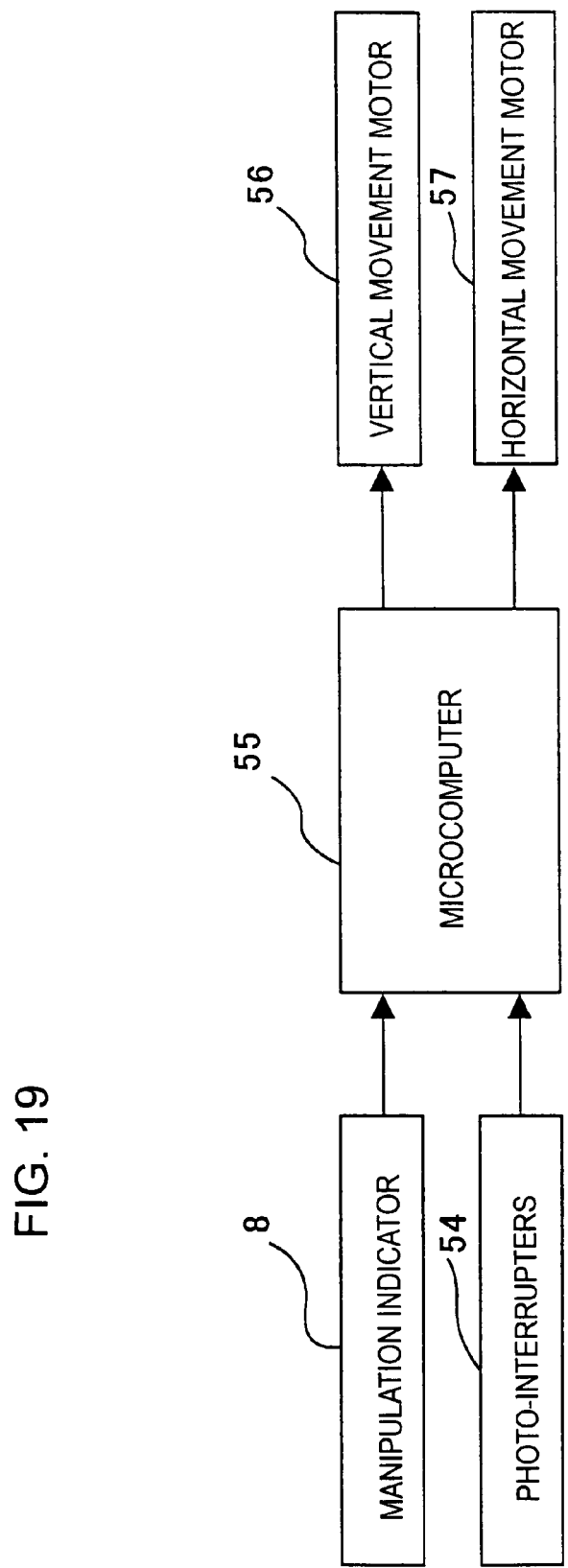
FIG. 19 is a block diagram showing the control mechanism of a projection lens moving apparatus.

Referring to FIG. 19, there is shown in block diagram a control procedure for controlling the projection lens moving mechanism 53. A microcomputer 55 serving as a controller is adapted to control a motor 56 for effecting a vertical motion (the motor referred to as vertical movement motor 56) and a motor 57 for effecting a horizontal motion (the motor referred to as horizontal movement motor 57) based on the information received from the manipulation indicator 8 and/or the separate type photo-interrupters 54. Based on the output(s) of the photo-interrupters 54, the microcomputer 55 detects the position of the moveable member(s) in motion interrupting the sensor light of the photo-interrupter(s) 54, from which a determination is made as to whether the moveable members 531 and 532 are within given allowable move limits or not. It will be understood that ordinary U-shaped photo-interrupters may be used in place of the separate type photo-interrupters 54 if the movements of the vertically moveable member 531 and horizontally moveable member 532 are small.

Figure 20:
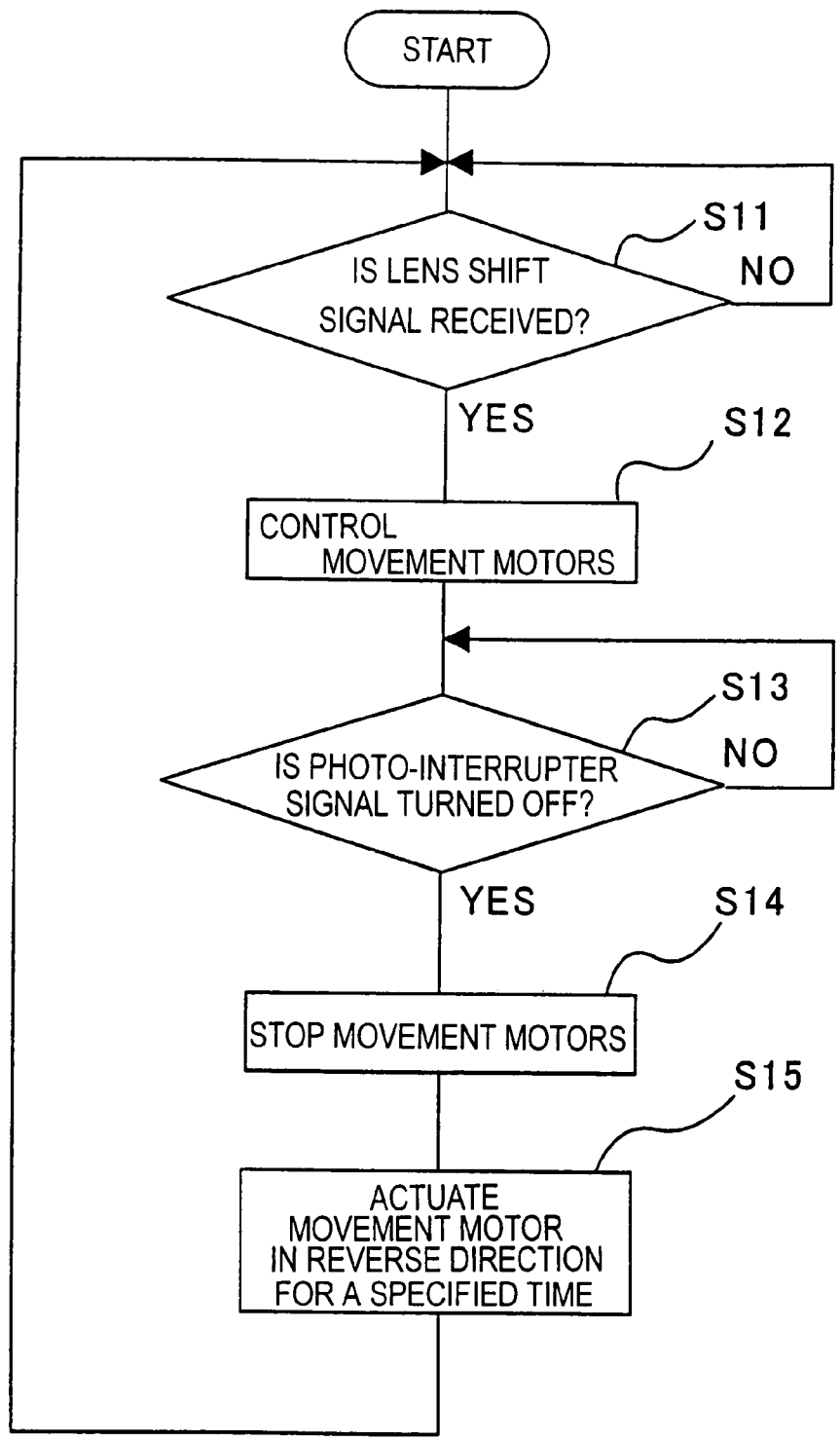
FIG. 20 is a flowchart illustrating an exemplary procedure of controlling the limitative movement of the projection lens moving apparatus.
Figure 21:
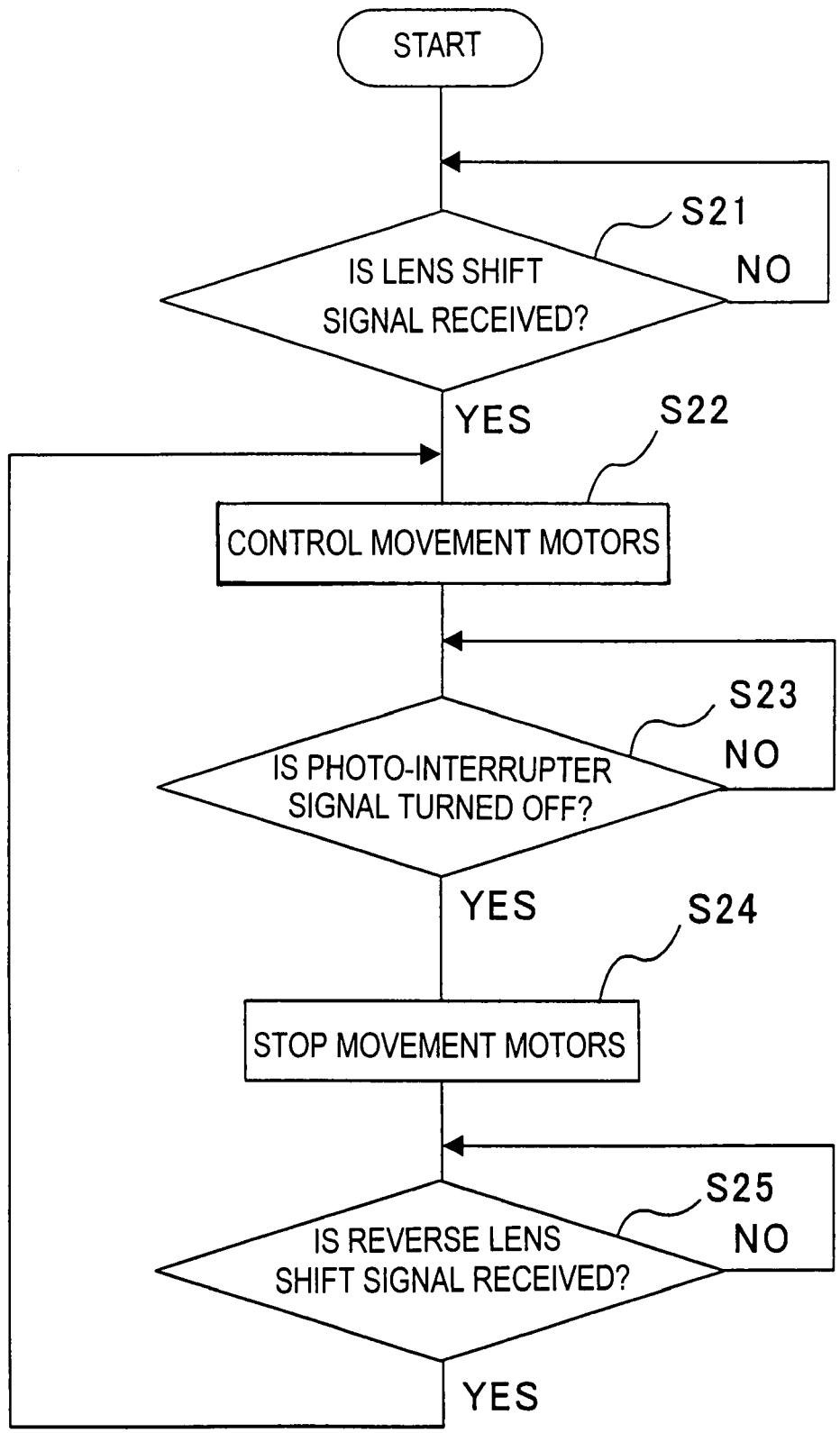
FIG. 21 is a flowchart illustrating alternative procedure of controlling the limitative movement of the projection lens moving apparatus.

FIGS. 20 and 21 are flowcharts illustrating exemplary steps of controlling the limitative movements of the vertically moveable member 531 and horizontally moveable member 532. In the example shown in FIG. 20, the control procedure waits for a lens shift signal from the manipulation indicator 8 ("NO" loop of Step S11), and upon receipt of a lens shift signal ("YES" in step S11), either the vertical movement motor 56 or horizontal movement motor 57 (denoted by vertical/horizontal movement motor 56/57) is controllably actuated as instructed by the lens shift signal (step S12).

Then, the procedure waits for an "OFF" signal from the separate type photo-interrupters 54 ("NO" loop of step S13). When an "OFF" signal is received ("YES" in step S13), a determination is made that the vertically/horizontally moveable member 531/532 has exceeded the predetermined allowable move limit, and the vertical/horizontal movement motor 56/57 is stopped (Step S14). The vertical/horizontal movement motor 56/57 is then controllably actuated in the reverse direction for a predetermined period of time so as to bring the motor to within the allowable move range (step S15), after which the procedure returns to step S11 (via "NO" loop of step S15) and waits for the next lens shift signal.

On the other hand, in the example shown in FIG. 21, the procedure waits for a lens shift signal from the manipulation indicator 8 ("NO" loop of Step S21), and, upon receipt of a lens shift signal ("YES" in step S21), the vertical/horizontal movement motor 56/57 is actuated as instructed by the lens shift signal (step S12), as in the procedure of FIG. 20.

Then, the procedure awaits the arrival of an "OFF" signal from the separate type photo-interrupters 54 (via "NO" loop of step S23). Since the arrival of "OFF" signal ("YES" in step S23) implies that the sensor light is interrupted by the vertically/horizontally moveable member 531/532, a determination is made that the vertically/horizontally moveable member 531/532 has exceeded a predetermined allowable move limit, and the vertically/horizontally movement motor 56/57 is stopped (Step S24). Next, the procedure waits for a reverse lens shift signal instructing a reverse move. Upon receipt of such lens shift signal, the procedure returns to step S22 (via "NO" loop from step S25) to resume the control of vertical/horizontal movement motor 56/57. It is noted that in the example shown herein the procedure does not employ reverse control of the motor that lasts for a predetermined period of time as in step S15 right after the motor is stopped and that instead only the reverse lens shift signal (to reverse the move) is accepted in step S25.

Thus, in the example shown herein, limiting the move in the vertical direction as well as in the horizontal direction can be achieved by a pair of photo-interrupters 54 and 54. Therefore, the manufacturing cost of the projector can be reduced accordingly. It is also noted that precise control of the limitative movement can be achieved solely by means of lens moving members, without resorting to any other parts. Furthermore, different move restrictions are possible using arbitrarily chosen configurations, other than quadrangles, for the through-holes 533 and 534 respectively formed in the respective vertically moveable member 531 and horizontally moveable member 532.

Although the invention has been described above with particular reference to a projection type image display apparatus that utilizes liquid crystal panels as the optical modulators, features of the invention not related to the liquid crystal panels can be also enjoyed in a projection type image display apparatus equipped with another type of imaging light generation system. In this sense, the invention can be applied to, for example, projectors utilizing a DLP (Digital Light Processing) system manufactured to market by Texas Instruments (TI), Inc. (registered trademark).

The invention claimed is:

1. A projection type image display apparatus equipped with an optical system adapted to project modulated imaging light obtained by modulating beams of light emitted from a high-temperature light source based on the image signals received to form an enlarged image on a display screen, said display apparatus comprising an optical system storage for storing said optical system, said optical system storage having:

an upper opening;

a high-temperature region for accommodating an optical element to be arranged proximal to said light source;

a low-temperature region for accommodating optical elements to be arranged distant from said light source, and a multiplicity of frames arranged in said upper opening, each of said frame having an upper opening for receiving an optical element, said opening covered, in said high-temperature region, with a resilient metal lid and, in said low-temperature region, with a resilient resin lid.

2. The projection type image display apparatus according to claim 1, wherein said optical system includes:

at least a first integrator lens, an iris mechanism, a second integrator lens, a slit, a polarization beam splitter, and a condenser lens, all arranged to pass white light received from said light source through said combination in a desired manner;

a multiplicity of dichroic mirrors for splitting the white light that has passed through said condenser lens into red (R), green (G), and blue (B) light;

three liquid crystal panels for respectively extracting R, G, B light;

a color composition prism for composing said R, G, B lights into tri-color imaging light; and a projection lens for projecting said tri-color imaging light.

3. The projection type image display apparatus according to claim 2, wherein said first integrator lens is fitted in the frame in said high-temperature region;

a portion of said metal lid associated with said frame is cut into spring-like narrow strips having V-shaped projecting tips for firmly holding the upper end of said first integrator lens fitted in said frame;

lenses of said optical system other than said first integrator lens are fitted in the respective frames in said low-temperature region; and portions of said resin lid associated with said respective frames are partially cut into spring-like narrow strips having protruding tips for firmly holding the upper ends of said lenses fitted in said respective frames, whereby the dimensional tolerances of said lenses and frames are absorbed by said lids.

* * * * *